(12) United States Patent
Fu et al.

(10) Patent No.: US 8,768,798 B2
(45) Date of Patent: *Jul. 1, 2014

(54) INVOICING SYSTEM

(75) Inventors: Paul Fu, San Jose, CA (US); Erik Hansen, San Jose, CA (US); George Liang, Campbell, CA (US); Deborah Liu, Santa Clara, CA (US); Ngan-Ha D. Nguyen, Belmont, CA (US); Andrew Leigh Sandler, San Jose, CA (US)

(73) Assignee: eBay Inc., San Jose, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 12/819,972

(22) Filed: Jun. 21, 2010

(65) Prior Publication Data

US 2010/0280894 A1 Nov. 4, 2010

Related U.S. Application Data

(63) Continuation of application No. 10/882,633, filed on Jun. 30, 2004, now Pat. No. 7,742,947.

(60) Provisional application No. 60/495,608, filed on Aug. 14, 2003, provisional application No. 60/501,251, filed on Sep. 8, 2003.

(51) Int. Cl.
*G07F 19/00* (2006.01)

(52) U.S. Cl.
USPC .............................. 705/34; 705/24; 705/26.8

(58) Field of Classification Search
USPC .............................. 705/26.81, 34, 26.1, 27.1
See application file for complete search history.

(56) References Cited

U.S. PATENT DOCUMENTS

| | | | |
|---|---|---|---|
| 5,070,463 A | | 12/1991 | Schuricht et al. |
| 5,778,178 A | | 7/1998 | Arunachalam |
| 5,803,500 A | * | 9/1998 | Mossberg ...................... 283/67 |
| 5,987,429 A | | 11/1999 | Maritzen |
| 5,987,500 A | | 11/1999 | Arunachalam |
| 6,169,791 B1 | * | 1/2001 | Pokress .................... 379/114.02 |
| 6,212,556 B1 | | 4/2001 | Arunachalam |
| 6,615,226 B1 | | 9/2003 | Hartman et al. |

(Continued)

FOREIGN PATENT DOCUMENTS

| | | |
|---|---|---|
| KR | 2002004606 A | 1/2002 |
| WO | WO-2005017704 A2 | 2/2005 |

(Continued)

OTHER PUBLICATIONS

Auctioninc 1, http://web.archive.org/web/20030809092025/http://auctioninc.com/.*

(Continued)

*Primary Examiner* — Mark Fadok
(74) *Attorney, Agent, or Firm* — Schwegman Lundberg & Woessner, P.A.

(57) ABSTRACT

In one embodiment, a computerized method facilitates invoicing for transactions in a network-based transaction system. The method includes identifying a plurality of transactions to which a first entity is a party, identifying first and second transactions from the plurality of transactions that satisfy combinable criteria relating to combining transactions into a single invoice, and providing to the first entity an indication of the combinability of transactions of the first and second transactions into the single invoice. The method can also be implemented on a machine readable medium.

23 Claims, 65 Drawing Sheets

(56) References Cited

U.S. PATENT DOCUMENTS

| | | | |
|---|---|---|---|
| 7,324,968 | B2 | 1/2008 | Rotman et al. |
| 7,587,362 | B2 | 9/2009 | Karpovich et al. |
| 7,702,579 | B2* | 4/2010 | Neely et al. ............... 705/40 |
| 7,742,947 | B2 | 6/2010 | Fu et al. |
| 7,805,365 | B1* | 9/2010 | Slavin et al. ............... 705/40 |
| 7,827,103 | B1 | 11/2010 | Fu et al. |
| 2001/0027471 | A1 | 10/2001 | Paulose et al. |
| 2001/0051878 | A1 | 12/2001 | Yong |
| 2002/0038266 | A1 | 3/2002 | Tuttrup et al. |
| 2002/0046191 | A1 | 4/2002 | Joao |
| 2002/0077977 | A1* | 6/2002 | Neely et al. ............... 705/40 |
| 2002/0095306 | A1* | 7/2002 | Smith et al. ............... 705/1 |
| 2002/0111876 | A1 | 8/2002 | Rudraraju et al. |
| 2002/0133434 | A1 | 9/2002 | Nevel et al. |
| 2002/0198787 | A1 | 12/2002 | Yang |
| 2003/0171998 | A1 | 9/2003 | Pujar et al. |
| 2003/0182222 | A1 | 9/2003 | Rotman et al. |
| 2004/0039689 | A1 | 2/2004 | Penney et al. |
| 2004/0059673 | A1* | 3/2004 | Kitchen et al. ............ 705/40 |
| 2004/0083167 | A1* | 4/2004 | Kight et al. ............... 705/40 |
| 2005/0177448 | A1 | 8/2005 | Fu et al. |
| 2005/0210022 | A1 | 9/2005 | Philippe et al. |
| 2007/0265962 | A1 | 11/2007 | Bowe, Jr. et al. |
| 2010/0257045 | A1 | 10/2010 | Fu |
| 2010/0257046 | A1 | 10/2010 | Fu et al. |

FOREIGN PATENT DOCUMENTS

| | | | |
|---|---|---|---|
| WO | WO-2005017704 | A3 | 2/2005 |
| WO | WO-2005026905 | A2 | 3/2005 |
| WO | WO-2005026905 | A3 | 3/2005 |

OTHER PUBLICATIONS

Auctioninc 2, "Sales OnLine Direct's aiSeller(TM) Increases eBay Online Auction Sellers' Productivity by 50%+", PR Newswire. New York: Jun. 24, 2003. p. 1.*
Auctioninc 3, "Sales OnLine Direct Launches Advanced Checkout System for Auctions on eBay", PR Newswire. New York: Aug. 22, 2002. p. 1.*
Auctioninc 4, "Sales Online Direct Introduces The First Integrated Real-Time Auction and E-Commerce Multi-Carrier Shipping Calculator, Reduces Online Shopping Cart Abandonment", PR Newswire. New York: Mar. 26, 2002. p. 1.*
Auctioninc 5, http://web.archive.org/web/20030802025432/http://www.auctioninc.com/info/page/aiseller_tour_checkout_1.*
Auctioninc 6 http://web.archive.org/web/20030802025548/http://www.auctioninc.com/info/page/aiseller_tour_managesales_1.*
Merrill, Ken, "Six ideas for integrating e-comerce into your ERP", AFP Echange, Apr. 2001.*
Anonymous, Tech beat: E-comerce showcase—http://www.idmagonline.com., ID, dated Jul. 2000.*
Dillon, Nancy, Nabisco cooks up storage savings, Computerworld, May 18, 1998.*
Romano, Catherine, "Purchasing cards save money", Management Review, dated Apr. 1994.*
"Lincoln Properties selects SupplyCore as procurement Partner", PrNewswire2, (Oct. 16, 2001).
"Paragren Technologies Announces Tele-trend market intelegence service bureau", PR Newswire, (Dec. 2, 1998).
"Definition of invoice", *Barrons Dictionary of Finance and investment terms*, (1998), 302.
"International Application Serial No. PCT/US04/26362, International Search Report mailed Jun. 16, 2005", 4 pgs.
"International Application Serial No. PCT/US04/26362, Written Opinion mailed Jun. 16, 2005", 3 pgs.
Whiting, R., "Biz intelligence turns to suppliers", Information Week, (Oct. 15, 2001).
Yan, et al., "Convergence auditing: The context of improved billing service—with reference to the experience of British Telecom", *Managerial Auditing Journal Circa*, (1999).
U.S. Appl. No. 10/882,633, Advisory Action mailed Feb. 27, 2007, 3 pgs.
U.S. Appl. No. 10/882,633, Appeal Brief filed May 15, 2007, 19 pgs.
U.S. Appl. No. 10/882,633, Examiner's Answer mailed Aug. 14, 2007, 9 pgs.
U.S. Appl. No. 10/882,633, Examiner's Answer mailed Dec. 10, 2008, 12 pgs.
U.S. Appl. No. 10/882,633, Final Office Action mailed Sep. 12, 2006, 8 pgs.
U.S. Appl. No. 10/882,633, Final Office Action mailed Dec. 19, 2006, 10 pgs.
U.S. Appl. No. 10/882,633, Non Final Office Action mailed Sep. 19, 2005, 7 pgs.
U.S. Appl. No. 10/882,633, Notice of Allowance mailed Feb. 8, 2010, 12 pgs.
U.S. Appl. No. 10/882,633, Preliminary Amendment mailed Feb. 17, 2006, 3 pgs.
U.S. Appl. No. 10/882,633, Reply Brief filed Feb. 10, 2009 to Examiner's Answer mailed Dec. 10, 2008, 5 pgs.
U.S. Appl. No. 10/882,633, Reply Brief filed Oct. 12, 2007 to Examiner's Answer mailed Aug. 14, 2007, 5 pgs.
U.S. Appl. No. 10/882,633, Response filed Jan. 24, 2006 to Non Final Office Action mailed Sep. 19, 2005, 13 pgs.
U.S. Appl. No. 10/882,633, Response filed Feb. 1, 2007 to Final Office Action mailed Dec. 19, 2006, 14 pgs.
U.S. Appl. No. 10/882,633, Response filed Jun. 8, 2005 to Restriction Requirement mailed Apr. 8, 2005, 9 pgs.
U.S. Appl. No. 10/882,633, Response filed Nov. 10, 2006 to Final Office Action mailed Sep. 12, 2006, 12 pgs.
U.S. Appl. No. 10/882,633, Restriction Requirement mailed Apr. 8, 2005, 7 pgs.
U.S. Appl. No. 10/882,974, Notice of Allowance mailed Jun. 29, 2010, 18 Pgs.
U.S. Appl. No. 10/882,974, Examiner Interview Summary mailed Jul. 15, 2008, 2 pgs.
U.S. Appl. No. 10/882,974, Examiner Interview Summary mailed Nov. 19, 2009, 3 pgs.
U.S. Appl. No. 10/882,974, Final Office Action mailed Oct. 23, 2008, 24 pgs.
U.S. Appl. No. 10/882,974, Non Final Office Action mailed May 12, 2009, 2 pgs.
U.S. Appl. No. 10/882,974, Non-Final Office Action mailed Mar. 19, 2008, 3 pgs.
U.S. Appl. No. 10/882,974, Non-Final Office Action mailed Nov. 19, 2009, 21 Pgs.
U.S. Appl. No. 10/882,974, Preliminary Amendment mailed Feb. 27, 2006, 3 pgs.
U.S. Appl. No. 10/882,974, Response filed Feb. 23, 2009 to Final Office Action mailed Oct. 23, 2008, 17 pgs.
U.S. Appl. No. 10/882,974, Response filed Apr. 19, 2010 to Non Final Office Action mailed Nov. 19, 2009, 17 pgs.
U.S. Appl. No. 10/882,974, Response filed Jul. 21, 2008 to Non-Final Office Action mailed Mar. 19, 2008, 18 pgs.
U.S. Appl. No. 10/882,974, Response filed Aug. 12, 2009 to Non Final Office Action mailed May 12, 2009, 13 pgs.
Chinese Application Serial No. 200480029604.3, Office Action mailed Jul. 30, 2010, 3 Pgs.
Chinese Application Serial No. 200480029604.3, Office Action mailed Dec. 11, 2009, 6 pgs.
Chinese Application Serial No. 200480029604.3, Office Action Response Filed Oct. 7, 2010, pgs.
European Application Serial No. 04781104.7, Office Action mailed Jan. 5, 2007, 2 pgs.
European Application Serial No. 04781104.7, Office Action mailed Sep. 29, 2008, 4 pgs.
European Application Serial No. 04781104.7, Response filed Feb. 3, 2009 to Office Action mailed Sep. 29, 2008, 15 pgs.
European Application Serial No. 04781104.7, Supplemental European Search Report mailed Mar. 19, 2008, 2 pgs.
International Application Serial No. PCT/US04/26362, International Preliminary Report on Patentability mailed Mar. 2, 2006, 5 pgs.
Korean Application Serial No. 2006-7003128, Final Office Action mailed Feb. 11, 2008, 14 pgs.

(56) References Cited

OTHER PUBLICATIONS

Korean Application Serial No. 2006-7003128, Office Action mailed Jul. 6, 2007, 17 pgs.

Korean Application Serial No. 2006-7003128, Response filed May 13, 2008 to Final Office Action mailed Feb. 11, 2008, 19 pgs.

Korean Application Serial No. 2006-7003128, Response filed Oct. 5, 2007 to Office Action mailed Jul. 6, 2007, 58 pgs.

Korean Application Serial No. 2008-7011414, Office Action mailed Aug. 13, 2008, 23 pgs.

Korean Application Serial No. 2008-7011414, Response filed May 13, 2009 to Final Office Action mailed Feb. 10, 2009, 107 pgs.

Korean Application Serial No. 2008-7011414, Response filed Oct. 13, 2008 to Office Action mailed Aug. 13, 2008, 67 pgs.

U.S. Appl. No. 12/820,046, Non Final Office Action mailed Aug. 9, 2012, 20 pgs.

U.S. Appl. No. 12/820,066, Non Final Office Action mailed Aug. 8, 2012, 20 pgs.

U.S. Appl. No. 12/820,046, Final Office Action mailed Nov. 29, 2012, 19 pgs.

U.S. Appl. No. 12/820,046, Response filed Nov. 7, 2012 to Non Final Office Action mailed Aug. 9, 2012, 15 pgs.

U.S. Appl. No. 12/820,066, Final Office Action mailed Nov. 29, 2012, 20 pgs.

U.S. Appl. No. 12/820,066, Response filed Nov. 7, 2012 to Non Final Office Action mailed Aug. 8, 2012, 14 pgs.

U.S. Appl. No. 12/820,046, Non Final Office Action mailed Mar. 28, 2013, 25 pgs.

U.S. Appl. No. 12/820,046, Response filed Feb. 28, 2013 to Final Office Action mailed Nov. 29, 2012, 16 pgs.

U.S. Appl. No. 12/820,046, Response filed Jun. 28, 2013 to Non Final Office Action mailed Mar. 28, 2013, 16 pgs.

U.S. Appl. No. 12/820,066, Response filed Jul. 1, 2013 to Non Final Office Action mailed Apr. 1, 2013, 16 pgs.

U.S. Appl. No. 12/820,066, Non Final Office Action mailed Apr. 1, 2013, 24 pgs.

U.S. Appl. No. 12/820,066, Response filed Feb. 28, 2013 to Final Office Action mailed Nov. 29, 2012, 16 pgs.

Chinese Application Serial No. 200480029604.3, Response filed Apr. 23, 2010, with English translation of claims, 12 pgs.

Korean Application Serial No. 2008-7011414, Amendment filed Jun. 11, 2009, 47 pgs.

Korean Application Serial No. 2008-7011414, Appeal Against Final Rejection filed May 13, 2009, 55 pgs.

Korean Application Serial No. 2008-7011414, Re-examination Report mailed Jul. 22, 2009, with English translation of claims, 4 pgs.

U.S. Appl. No. 12/820,046, Final Office Action mailed Jul. 25, 2013, 20 pgs.

U.S. Appl. No. 12/820,066, Final Office Action mailed Jul. 19, 2013, 20 pgs.

\* cited by examiner

HOME | SITE MAP | SIGN OUT
[ BROWSE ] [ SELL ] [ SERVICES ] [ SEARCH ] [ HELP ] [ COMMUNITY ]

SELECT A BUYER TO INVOICE

HERE IS A LIST OF BUYERS WHO HAVE PURCHASED MULTIPLE ITEMS FROM YOU. TO COMBINE THEIR PURCHASES, SELECT A BUYER AND CLICK CONTINUE >

SELECT BUYER:
- ALWAYSWIN
- GET_IT_NOW
- GOODDEALS
- LOVETOBUY
- MUSICMAN_99

[ CONTINUE > ]

NOTE: YOU CAN ALLOW BUYERS TO COMBINE THEIR ITEMS AUTOMATICALLY BY SPECIFYING A SHIPPING DISCOUNT NOW

ANNOUNCEMENTS | REGISTER | SAFEHARBOR (RULES & SAFETY) | FEEDBACK FORUM

```
                                          HOME | SITE MAP | SIGN OUT
              [ BROWSE ] [ SELL ] [ SERVICES ] [ SEARCH ] [ HELP ] [ COMMUNITY ]

COMBINE PURCHASES
REVIEW OR UPDATE THE INFORMATION BELOW. WHEN YOU'RE DONE, CLICK COMBINE PURCHASE: AND
COMPANY WILL COMBINE THE PURCHASES INTO ONE SALES ORDER

BUYER:    ALWAYSWIN (49) ☆
ZIP CODE: 94125* (FOR SHIPPING CALCULATIONS)
          * PLEASE CONFIRM WITH THE BUYER
```

ENTER PAYMENT DETAILS

THIS BUYER HAS RECENTLY PURCHASED THE FOLLOWING ITEMS. IF YOU WANT TO REMOVE ANY, JUST UNCHECK THEM

| SELECT | ITEM # | ITEM TITLE | QTY | PRICE | SUBTOTAL |
| :--- | :--- | :--- | :--- | :--- | :--- |
| ☑ | 2902669 | PLAYSTATION 2 PS2 SYSTEM PACKAGE | 1 | $165.00 | $165.00 |
| ☑ | 2902673 | 2 X PLAYSTATION PS2 DUAL SHOCK 2 CONTROLLER | 1 | $23.50 | $23.50 |

SUBTOTAL: $188.50
SHIPPING AND HANDLING: $[ 12.00 ]
SHIPPING INSURANCE: [REQUIRED ▽] $[ 1.30 ]
SALES TAX: [CALIFORNIA ▽] [ 8.250 ]%
☐ APPLY SALES TAX TO SUBTOTAL + SHIPPING AND HANDLING

TOTAL: $201.80
RECALCULATE

ENTER PAYMENT INSTRUCTIONS & PERSONAL MESSAGE

GIVE CLEAR INSTRUCTIONS TO ASSIST BUYERS WITH PAYMENT, SHIPPING AND RETURNS

```
I HAPPILY COMBINE SHIPPING TO OFFER YOU A DISCOUNT WHEN YOU PURCHASE MORE THAN
ONE ITEM FROM ME. PURCHASE CAN BE COMBINED WITHIN 7 DAYS OF WINNING THE INITIAL
ITEM. I PREFER PAYPAL, BUT WILL ACCEPT MONEY ORDER OR CASHIERS CHECK. THANKS FOR
SHOPPING FROM ME.
```

NOTE: 500 CHARACTERS LIMIT.

*FIG. 10AA*

SELECT PAYMENT METHODS FOR THIS ORDER
YOU CAN CHOOSE ADDITIONAL PAYMENT METHODS YOU WILL ACCEPT. CERTAIN PAYMENT METHODS MAY NOT
BE EDITABLE IF ACCEPTABLE ON ALL PURCHASES *

FAST, EASY, SECURE PAYMENT.

☑           PAYMENT WILL GO TO:    OMNI_TRADINGS@HOTMAIL.COM
                                         ENTER YOUR EMAIL ADDRESS
☑ MONEY ORDER OR CASHIERS CHECK    ☐ COD (CASH ON DELIVERY)
☐ PERSONAL CHECK                    ☐ OTHER ONLINE PAYMENT SERVICES

MERCHANT CREDIT CARD
ONLY FOR SELLERS ACCEPTING CREDIT CARD PURCHASES THROUGH THEIR OWN
MERCHANT ACCOUNT.
       ☐ VISA / MASTERCARD     ☐ DISCOVER     ☐ AMERICAN EXPRESS

☑ COPY ME ON THIS INVOICE

[ SEND INVOICE > ]
AFTER YOU CLICK THIS BUTTON, YOUR BUYER WILL BE EMAILED AN INVOICE

---

ANNOUNCEMENTS | REGISTER | SAFEHARBOR (RULES & SAFETY) | FEEDBACK FORUM

*FIG. 10BB*

```
                                        HOME | SITE MAP | SIGN OUT
              [ BROWSE  |  SELL  |  SERVICES  |  SEARCH  |  HELP  | COMMUNITY ]

PAY NOW FOR MULTIPLE ITEMS
  YOUR SELLER, PAT, HAS COMBINED YOUR PURCHASES INTO A SINGLE ORDER. YOU CAN CONVENIENTLY
  PAY FOR ALL OF THESE ITEMS BY CLICKING THE PAY NOW BUTTON AT THE BOTTOM OF THE PAGE

ITEMS #        ITEM TITLE                                  QTY.    PRICE      SUBTOTAL
  2903932    2 CHARISMA PILLOWS~GOOSE DOWN~KING PILLOW        1     $30.00       $30.00
  2903933    CROSCILL LOVE STORY KING PILLOW CASES 1ST QUA    1     $169.00      $169.00
                                                                  SUBTOTAL:      $199.00
                                                       SHIPPING AND HANDLING:    $23.50
                                               SHIPPING INSURANCE: (NOT OFFERED)   —
                                                                 SALES TAX:      $18.36
                                                                 TOTAL:  $      [240.86]

[ PAY NOW > ]

OR PAY FOR ITEMS INDIVIDUALLY

ANNOUNCEMENTS  |  REGISTER  |  SAFEHARBOR (RULES & SAFETY)  |  FEEDBACK FORUM
```

*FIG. 13*

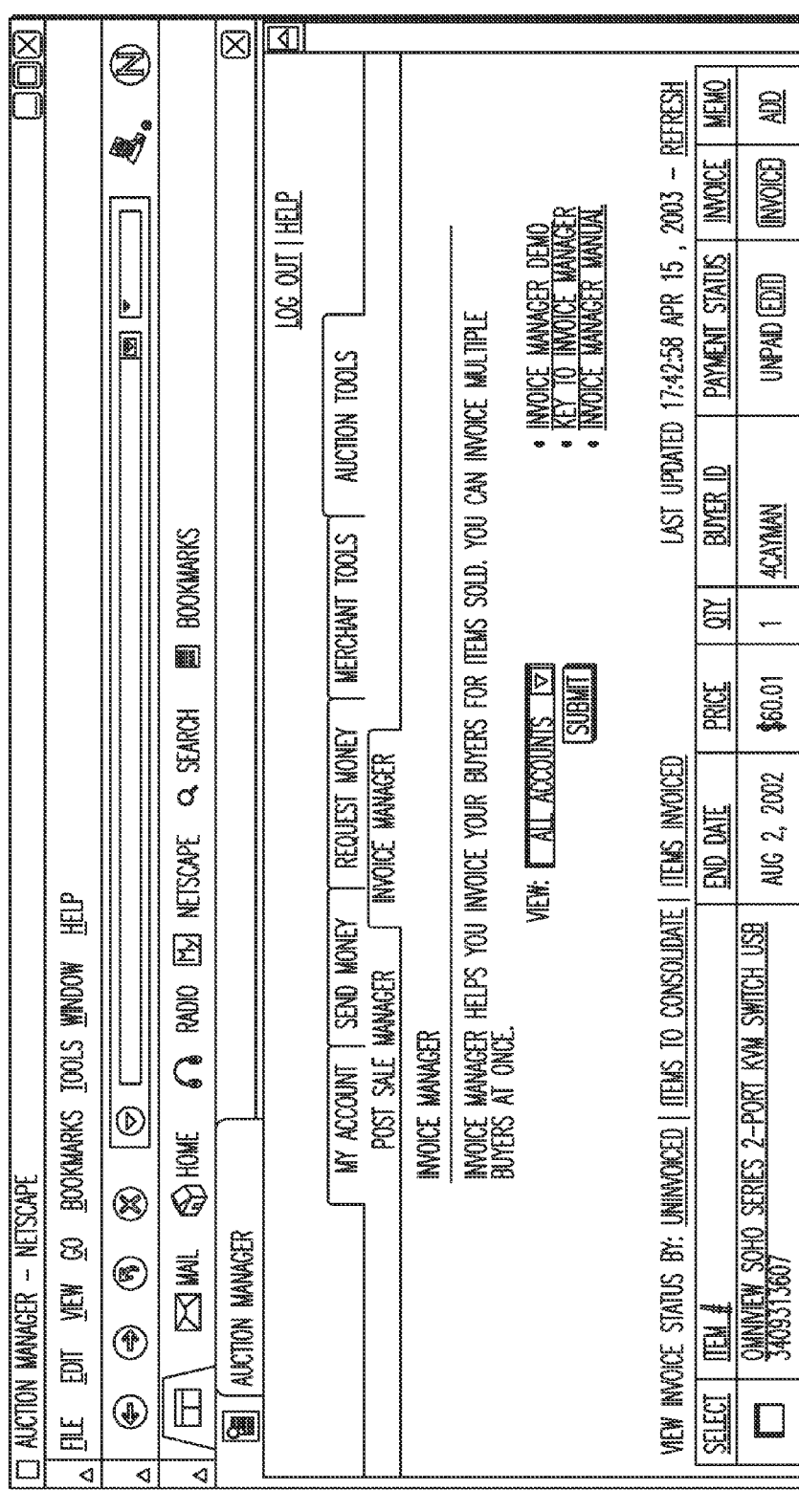

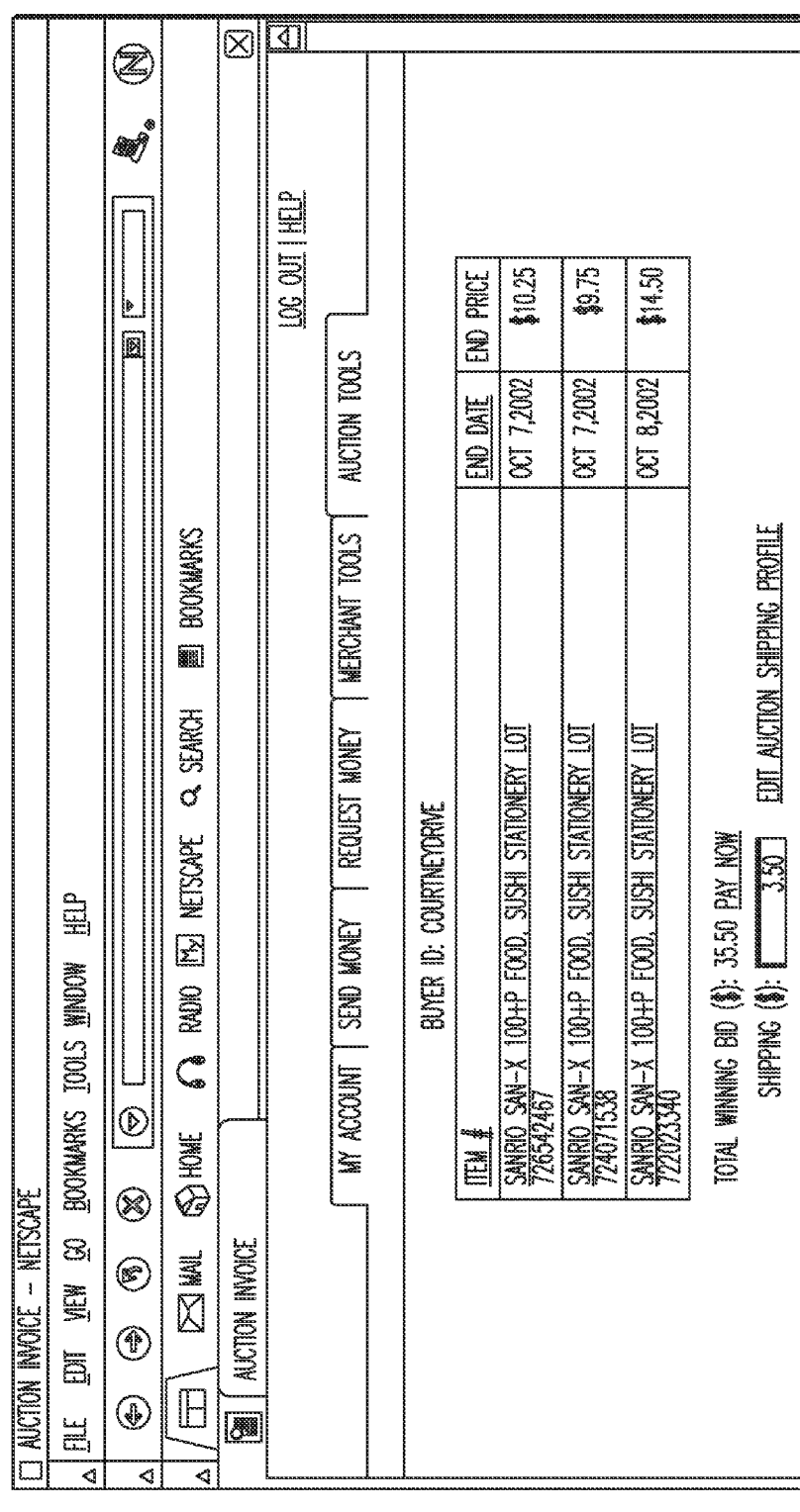

INSURANCE PER ITEM($): [OPTIONAL ▽]
SALES TAX (%): [ ] EDIT SALES TAX PROFILE

BUYER ID: EIK914600@EARTHLINK.NET

| ITEM # | END DATE | END PRICE |
|---|---|---|
| WINTER 7 SCRAPBOOKING FIBERS PAPER PIECING 1781111569 | OCT 7,2002 | $3.80 |
| WINTER 7 SCRAPBOOKING FIBERS PAPER PIECING 1781111482 | OCT 7,2002 | $3.80 |

TOTAL WINNING BID ($): 7.60 PAY NOW
SHIPPING ($): [3.50]    EDIT AUCTION SHIPPING PROFILE
INSURANCE PER ITEM($): [OPTIONAL ▽]
SALES TAX (%): [ ] EDIT SALES TAX PROFILE

FORMATTING OPTIONS
EDIT YOUR INVOICE BY FILLING IN THE INFORMATION BELOW. YOU CAN PREVIEW YOUR INVOICE BY CLICKING THE "PREVIEW" BUTTON.

SENDING EMAIL: DANTLEY@YAHOO.COM
MESSAGE TO BUYER: THANK YOU FOR YOUR PURCHASE! PLEASE PAY ME USING
(OPTIONAL) CREDIT CARDS OR BANK TRANSFERS WITH PAYPAL. JUST CLICK
ON THE BUTTON AND PAY ME INSTANTLY!

FIG. 17B

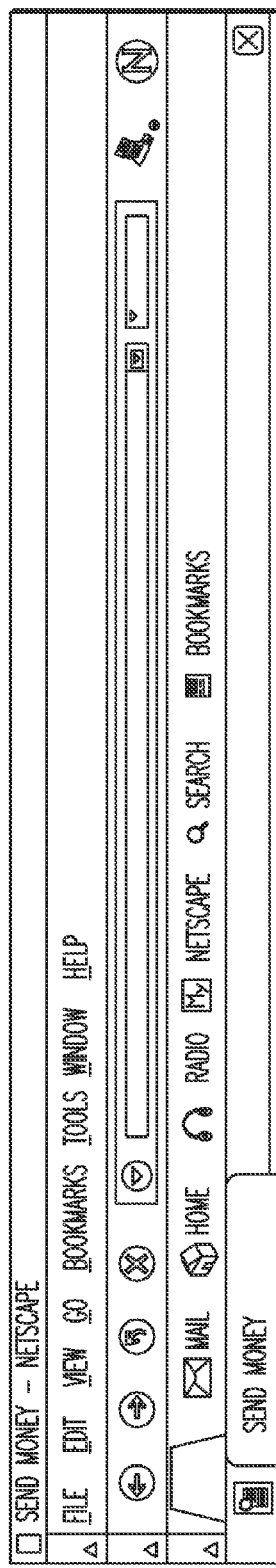

AMOUNT: $714.00
SHIPPING & HANDLING: $20.00 95051 ZIP CODE
SHIPPING INSURANCE (OPTIONAL): 5.00
SALES TAX: $10.00 8.725% CA
TOTAL AMOUNT: $744.00

IF YOU NEVER PAID THROUGH THIS METHOD [CLICK HERE]

LOGIN
EMAIL ADDRESS: GEORGECHO@HOTMA
PASSWORD:

PROBLEMS LOGGING IN?
FORGET YOUR PASSWORD?

|                          |                                                          |
|--------------------------|----------------------------------------------------------|
| AMOUNT:                  | $714.00                                                  |
| SHIPPING & HANDLING:     | $20.00  95051 ZIP CODE                                   |
| SHIPPING INSURANCE:      | $5.00                                                    |
| (OPTIONAL)               |                                                          |
| SALES TAX:               | $10.00  8.725% CA                                        |
| TOTAL AMOUNT:            | $744.00                                                  |

☐ CLICK TO BUY : MONEY BUY GUARANTEE FOR $2.38. ENSURE SATISFACTION OR YOUR MONEY BACK (PHYSICAL GOODS ONLY). LEARN MORE

SOURCE OF FUNDS
  BALANCE: $713.44
  INSTANT TRANSFER: $30.56 FROM WELLS FARGO XXXXXX5555
  BACK UP FUNDING SOURCE: VISA XXXX-XXXX-XXXX-5555

MORE FUNDING OPTIONS

SHIPPING INFORMATION
  ⦿ SHIP TO  [5555 BASCOM AVE, CAMPBELL, CA 95008, USA (CONFIRMED) ▽]
     ADD ADDRESS
  ○ NO SHIPPING ADDRESS REQUIRED

OPTIONAL INSTRUCTIONS

*FIG. 18BB*

ITEMS I'VE WON (4 ITEMS)

▸ SHOW ITEMS FOR PAST [30] DAYS [GO] (30 DAYS MAX) ☐  ⬨ SAVE THIS SETTING

| SELECT (ALL) | ITEM # | (PST) END DATE▲ | END PRICE | QTY. | SELLER | NEXT STEPS/STATUS | |
|---|---|---|---|---|---|---|---|
| ☐ | 49ERS JERRY RICE SIGNED 1988 TOPPS CARD 2902656 | MAR-19 16:49:32 | $4.50 | 1 | OMNI_TRADING1 | | LEAVE FEEDBACK |
| ☐ | PLAYSTATION 2 PS2 SYSTEM PACKAGE 1003886 | MAR-19 18:02:24 | $75.00 | 1 | TRADEMASTER1 | [PAY NOW] PURCHASE STATUS | LEAVE FEEDBACK |
| ☐ | PHILIPS JOGPROOF PORTABLE CD PLAYER 1003892 | MAR-19 18:02:24 | $35.00 | 1 | THE_MUSIC_MAN | | LEAVE FEEDBACK |
| ☐ | MADDEN NFL 2003 --PLAYSTATION 2 GAME NEW! 1003887 | MAR-19 18:02:59 | $10.00 | 1 | TRADEMASTER1 | [PAY NOW] PURCHASE STATUS | LEAVE FEEDBACK |
| | | PAGE TOTAL: (ITEMS I'VE WON) | $124.50 | 4 | | | |

[DELETE] SELECTED ITEMS.

< PREVIOUS ‖ SHOWING 1 – 4 OF 4 ‖ NEXT >
BACK TO TOP

⮂ INDICATES YOU MADE A SINGLE PAYMENT FOR THIS AND OTHER ITEMS FROM THE SAME SELLER

HOME | SITE MAP | SIGN OUT

| BROWSE | SELL | SERVICES | SEARCH | HELP | COMMUNITY |

SEND INFORMATION TO SELLER                         (?) NEED HELP?

PLEASE REVIEW AND CONFIRM THIS INFORMATION REGARDING YOUR PURCHASE. WHEN YOU ARE READY TO PAY, CLICK THE SEND INFORMATION TO SELLER BUTTON BELOW. THIS INFORMATION WILL BE EMAILED TO THE SELLER AND YOU

SHIPPING

SELLER SHOULD SHIP TO:   GOODDEALS
                         525 W SANTA CLARA ST
                         SAN JOSE, CA 95113, US
                         408-376-7400
                         CHANGE SHIPPING ADDRESS

PAYMENT

| ITEM # | ITEM TITLE | QTY. | PRICE | SUBTOTAL |
|---|---|---|---|---|
| 1003886 | PLAYSTATION 2 PS2 SYSTEM PACKAGE | 1 | $75.00 | $75.00 |
| 1003887 | MADDEN NFL 2003 - PLAYSTATION 2 PS2 GAME NEW! | 1 | $10.00 | $10.00 |

SUBTOTAL: $85.00
SHIPPING AND HANDLING: $9.00
SHIPPING INSURANCE: (NOT OFFERED) ---
SALES TAX (8.750% IN CA): $8.23
TOTAL: $ 102.23
YOU SAVED $3.00 ON SHIPPING.
NOT SURE HOW MUCH TO PAY? REQUEST TOTAL FROM SELLER

PAYMENT INSTRUCTIONS    DISCOUNTS HAPPILY GIVEN ON MULTIPLE PURCHASES. PLEASE SEND
                        CHECK OR MONEY ORDER TO TRADE MASTER, 2145 E. HAMILTON AVE.,
                        SAN JOSE, CA 94125. THANKS FOR SHOPPING FROM TRADE MASTER

PAYMENT METHOD          MONEY ORDER/ CASHIER CHECK
                        CHANGE PAYMENT METHOD

SEND PAYMENT TO:        TRADEMASTER
                        1234 AVENUE
                        NOWHERE, CA 91124

MESSAGE TO SELLER
(OPTIONAL)

*FIG. 23AA*

CONFIRMATION

IF YOUR PAYMENT AND SHIPPING DETAILS ARE CORRECT, CLICK THE SEND INFORMATION TO SELLER BUTTON BELOW. THIS INFORMATION WILL BE EMAILED TO THE SELLER AND YOU

IF YOU ARE MISSING INFORMATION YOU NEED BEFORE YOU CAN PAY, PLEASE ASK THE SELLER NOW.

[ SEND INFORMATION TO SELLER > ]

ANNOUNCEMENTS | REGISTER | SAFEHARBOR (RULES & SAFETY) | FEEDBACK FORUM

*FIG. 23AB*

```
                                    HOME | SITE MAP | SIGN OUT
         [BROWSE]  [ SELL ]  [SERVICES]  [SEARCH]  [ HELP ]  [COMMUNITY]

SEND PAYMENT TO SELLER                              (?) NEED HELP?

YOUR INFORMATION HAS BEEN EMAILED TO THE SELLER. NOW PLEASE SEND PAYMENT

┌─────────────────────────────────────────────────────────────────┐
│ NEXT STEP: PLEASE PAY THE SELLER $94.00 VIA MONEY ORDER/CASHIERS CHECK │
│                                                                 │
│  SELLER'S PAYMENT INSTRUCTIONS:      SELLER'S PAYMENT ADDRESS:  │
│  NO RETURNS                          TRADEMASTER                │
│                                                                 │
│                                      1234 AVENUE                │
│                                      NOWHERE, CA 91124          │
└─────────────────────────────────────────────────────────────────┘

TIP: YOU MAY WISH TO PRINT AN INVOICE TO INCLUDE WITH YOUR PAYMENT
GO TO PAYMENT STATUS

WHAT DO YOU WANT TO DO NEXT?
 ▶ VIEW THIS ITEM
 ▶ GO TO MY PAGE
 ▶ VIEW PAYMENT STATUS

─────────────────────────────────────────────

ANNOUNCEMENTS  |  REGISTER  |  SAFEHARBOR (RULES & SAFETY)  |  FEEDBACK FORUM
```

*FIG. 23B*

HOME | SITE MAP | SIGN OUT
BROWSE | SELL | SERVICES | SEARCH | HELP | COMMUNITY

REQUEST TOTAL FROM SELLER                                    (?) NEED HELP?

TO REQUEST THE TOTAL PLEASE CONFIRM YOUR SHIPPING ADDRESS BELOW SO THAT THE SELLER CAN
ACCURATELY CALCULATE YOUR TOTAL COSTS. THEN CLICK THE REQUEST TOTAL FROM SELLER BUTTON

| ITEM # | ITEM TITLE | QTY. |
|---|---|---|
| 1003893 | ENERGIZER RECHARGEABLE NIMH 4 AA BATTERIES | 1 |
| 1003892 | PHILIPS JOGPROOF PORTABLE CD PLAYER | 1 |

CONFIRM SHIPPING
SELLER SHOULD SHIP TO:   GOODDEALS
                         1234 AVENUE
                         NOWHERE, CA 95123

CHANGE SHIPPING ADDRESS

MESSAGE TO SELLER
(OPTIONAL)

☑ SEND A COPY OF THIS EMAIL TO ME

[ REQUEST TOTAL FROM SELLER > ]
THIS WILL SEND AN EMAIL TO YOUR SELLER

---

ANNOUNCEMENTS | REGISTER | SAFEHARBOR (RULES & SAFETY) | FEEDBACK FORUM

*FIG. 24*

|   |   |   |   | HOME | SITE MAP | SIGN OUT |
|---|---|---|---|---|---|---|
| BROWSE | SELL | SERVICES | SEARCH | HELP | COMMUNITY | |

BUYER'S PAYMENT STATUS

| | |
|---|---|
| STATUS | PLEASE PAY THE SELLER $94.00 VIA MONEY ORDER/CASHIERS CHECK |
| ACTIONS | LEAVE FEEDBACK |
| SELLER | TRADEMASTER |

SHIPPING

SELLER SHOULD SHIP TO:  GOODDEALS
1234 AVENUE
NOWHERE, CA 95123

PAYMENT

| ITEMS # | ITEM TITLE | QTY. | PRICE | SUBTOTAL |
|---|---|---|---|---|
| 1003886 | PLAYSTATION 2 PS2 SYSTEM PACKAGE | 1 | $75.00 | $75.00 |
| 1003887 | MADDEN NFL 2003 – PLAYSTATION 2 PS2 GAME NEW! | 1 | $10.00 | $10.00 |

SUBTOTAL: $85.00
SHIPPING AND HANDLING: $2.00
SHIPPING INSURANCE: (NOT OFFERED) ---
TOTAL: $94.00

| | |
|---|---|
| PAYMENT INSTRUCTIONS | NO RETURNS |
| PAYMENT METHOD | MONEY ORDER/ CASHIER CHECK |
| SEND PAYMENT TO: | TRADEMASTER
1234 AVENUE
NOWHERE, CA 95123 |

ANNOUNCEMENTS | REGISTER | SAFEHARBOR (RULES & SAFETY) | FEEDBACK FORUM

*FIG. 25A*

```
SUMMARY
LAST UPDATED ON 1/9/2003 2:44 PM 703

TO DO'S / ALERTS

⊙ 63 SOLD LISTINGS NEED TO BE SHIPPED
  ⊙ 39 SOLD LISTINGS ARE WAITING FOR PAYMENT
  ☆ 59 PAID LISTINGS ARE WAITING FOR FEEDBACK

QUICK STATS                            GMS           # OF LISTINGS

PRODUCT INVENTORY                                            1
  ▪ PRODUCTS SOON TO BE OUT OF STOCK                           0

PENDING LISTINGS                                             0
  ▪ STARTING WITHIN THE NEXT HOUR                              0
  ▪ STARTING TODAY                                             0

ACTIVE LISTINGS                      #2634.23              429
  ▪ CLOSING TODAY WITH A BUYER                                 0
  ▪ CLOSING TODAY WITHOUT A BUYER                              0

SOLD LISTINGS                        #3234.23              196
  ▪ BUYERS WITH COMBINABLE PURCHASES                           5
  ▪ AWAITING PAYMENT                                          39
  ▪ PAID AND READY TO SHIP
  ▪ PAID AND WAITING FOR FEEDBACK       COMBINE INVOICES LINK
  ▪ PAID AND SHIPPED
```

FROM: DOROTHY NELSON
1234 AVENUE
NOWHERE, CA 95123

SHIP TO: ANDREW GRANATO
95A W 16TH ST
BAYONNE, NJ 07002-2602
USA

INVOICE/PACKING SLIP

SHIP TO: ANDREW GRANATO
95A W 16TH ST
BAYONNE, NJ 07002-2602
USA

ANDREW.JOANMARIE@WORLDNET.ATT.NET

| QTY | ITEM # | ITEM NAME | PRICE | DATE FEB-23-03 | SALES RECORD 195 SUBTOTAL |
|---|---|---|---|---|---|
| 2 | 3114617022 | SILLY GOLD PUTTY IN CLEAR ORNAMENT CONTAINER! | $3.25 | | $6.50 |
| 3 | 3114617022 | SILLY SILVER PUTTY IN CLEAR ORNAMENT CONTAINER! | $3.25 | | $9.75 |
| | | | | SUBTOTAL | $16.25 |
| | | | | SHIPPING AND HANDLING | $4.75 |
| | | | | SALES TAX | N/A |
| | | | | TOTAL | $21.00 |

*FIG. 28*

COMBINED PURCHASES PREFERENCE

SHIPPING DISCOUNTS ALLOW YOUR BUYERS TO SAVE ON SHIPPING WHEN THEY PURCHASE MORE ITEMS FROM YOU. YOU CAN EXCLUDE INDIVIDUAL ITEMS FROM BEING DISCOUNTED

○ NO, DON'T ALLOW BUYERS TO COMBINE PURCHASES. I PREFER TO RECEIVE SEPARATE PAYMENTS FOR EACH PURCHASE

○ YES, ALLOW BUYERS TO COMBINE PURCHASES AND SEND A SINGLE PAYMENT. I WILL SPECIFY DISCOUNTS LATER

● YES, ALLOW BUYERS TO COMBINE ITEMS PURCHASED WITHIN [7 DAYS ▽] AND SEND A SINGLE PAYMENT. I WILL SPECIFY DISCOUNTS BELOW:

HOME | SITE MAP | SIGN OUT

| BROWSE | SELL | SERVICES | SEARCH | HELP | COMMUNITY |

| OVERVIEW | REGISTRATION | BUYING & SELLING | MY PAGE | ABOUT ME | FEEDBACK FORUM | RULES & SAFETY |

[          ] SEARCH TIPS
☐ SEARCH TITLES AND DESCRIPTIONS

COMBINED PURCHASES PREFERENCE

SHIPPING DISCOUNTS ALLOW YOUR BUYER TO SAVE ON SHIPPING WHEN THEY PURCHASE MORE ITEMS FROM YOU. YOU CAN EXCLUDE INDIVIDUAL ITEMS FROM BEING DISCOUNTED. TO USE THE COMBINE PURCHASE FEATURES, PLEASE TURN ON PAY NOW BUTTONS FOR YOU ITEMS

○ NO, DON'T ALLOW BUYERS TO COMBINE PURCHASES. I PREFER TO RECEIVE SEPARATE PAYMENTS FOR EACH PURCHASE

○ YES, ALLOW BUYERS TO COMBINE PURCHASES AND SEND A SINGLE PAYMENT. I WILL SPECIFY DISCOUNTS LATER

● YES, ALLOW BUYERS TO COMBINE ITEMS PURCHASED WITHIN [7 DAYS ▼] AND SEND A SINGLE PAYMENT. I WILL SPECIFY DISCOUNTS BELOW:

FLAT RATE SHIPPING                    ACTUAL RATE SHIPPING
CHARGE ONE PRICE FOR SHIPPING         CHARGE BASED ON WEIGHT
NATIONWIDE

LEARN HOW SHIPPING DISCOUNTS ARE CALCULATED FOR EACH OF THE OPTIONS BELOW

○ CHARGE MY HIGHEST SHIPPING COST FOR THE FIRST ITEM AND $[       ] FOR EACH ADDITIONAL ITEM. THIS AMOUNT CAN BE EDIT ON THE SELL YOUR ITEM FORM FOR EACH ITEM

● CHARGE MY HIGHEST SHIPPING COST FOR THE FIRST ITEM AND SHIP EACH ADDITIONAL ITEM FOR FREE

○ CHARGE MY HIGHEST SHIPPING COST AND DEDUCT $[       ] FROM THE SHIPPING COST OF EACH ADDITIONAL ITEM

NOTE: INFORM YOUR BUYERS OF YOUR SHIPPING OFFER BY INCLUDING IT IN THE ITEM DESCRIPTION

SHIPPING INSURANCE FOR COMBINED PURCHASES

*FIG. 32AA*

SHIPPING INSURANCE: [NOT OFFERED ▼]
IF SHIPPING INSURANCE IS OPTIONAL OR REQUIRED, COSTS MUST BE ENTERED BELOW

| COMBINED TOTAL | INSURANCE COST |
|---|---|
| $0.01 – $9.99 | $ [0] |
| $10.00 – $49.99 | $ [0] |
| $50.00 – $99.99 | $ [0] |
| $100.00 – $199.99 | $ [0] |
| $200.00 – $299.99 | $ [0] |
| $300.00 OR MORE | $ [0] |

[SAVE MY CHANGES]   [CANCEL]

ANNOUNCEMENTS | REGISTER | SAFEHARBOR (RULES & SAFETY) | FEEDBACK FORUM

*FIG. 32AB*

FLAT RATE SHIPPING                    ACTUAL RATE SHIPPING
CHARGE ONE PRICE FOR SHIPPING         CHARGE BASED ON WEIGHT
NATIONWIDE

CALCULATE ACTUAL RATE SHIPPING ON THE [COMBINED ITEM WEIGHT ▽]
LEARN HOW SHIPPING DISCOUNTS ARE CALCULATED FOR EACH OF THE OPTIONS BELOW

● CHARGE THE ACTUAL SHIPPING COST AND MY FULL PACKAGING OR HANDLING FEE FOR EACH ITEM

○ CHARGE THE ACTUAL SHIPPING COST AND A PACKAGING AND HANDLING FEE OF $ [_____] FOR
  THE ENTIRE ORDER

NOTE: INFORM YOUR BUYERS OF YOUR SHIPPING OFFER BY INCLUDING IT IN THE ITEM DESCRIPTION

SHIPPING INSURANCE FOR COMBINED PURCHASES

SHIPPING INSURANCE: [NOT OFFERED ▽]

[ SAVE MY CHANGES ]        [ CANCEL ]

*FIG. 32B*

| HOME | SITE MAP | SIGN OUT |
| BROWSE | SELL | SERVICES | SEARCH | HELP | COMMUNITY |
| OVERVIEW | REGISTRATION | BUYING & SELLING | MY PAGE | ABOUT ME | FEEDBACK FORUM | RULES & SAFETY |

[ SEARCH ] TIPS
☐ SEARCH TITLES AND DESCRIPTIONS

---

COMBINED PURCHASES PREFERENCES CHANGES:
CHANGES WERE MADE ON MAR-18-03 13:08:49 PST

COMBINED PURCHASE STATUS:        BUYERS CAN COMBINE
                                 SHIPPING DISCOUNTS SPECIFIED

SHIPPING DISCOUNT STATUS:        BUYERS WILL SEE: "SAVE UP TO 25% ON SHIPPING
                                 WHEN YOU BUY ADDITIONAL ITEMS FROM THIS SELLER"

---

YOU CAN FURTHER EDIT YOUR COMBINED PURCHASE AND SHIPPING DISCOUNT PREFERENCES AT YOUR CONVENIENCE

WHERE CAN WE TAKE YOU?
▶ ITEM I LAST LOOKED AT
▶ MY BIDDING/WATCHING PAGE
▶ MY PREFERENCES TAB

---

ANNOUNCEMENTS | REGISTER | SAFEHARBOR (RULES & SAFETY) | FEEDBACK FORUM

*FIG. 33A*

| | | HOME | SITE MAP | SIGN OUT |
| BROWSE | SELL | SERVICES | SEARCH | HELP | COMMUNITY |

COMBINE PURCHASES

GOODDEALS, YOU HAVE PURCHASED A NUMBER OF ITEMS FROM TRADEMASTER. YOU CAN NOW COMBINE THESE PURCHASES INTO A SINGLE PAYMENT. TO DO SO, JUST CLICK THE PAY FOR ITEMS BUTTON

| SELECT | ITEM # | ITEM TITLE | QTY | PRICE | SUBTOTAL |
|---|---|---|---|---|---|
| ☑ | 1003886 | PLAYSTATION 2 PS2 SYSTEM PACKAGE | 1 | $75.00 | $75.00 |
| ☑ | 1003887 | MADDEN NFL 2003–PLAYSTATION 2 PS2 GAME NEW! | 1 | $10.00 | $10.00 |

SUBTOTAL: $85.00
SHIPPING AND HANDLING: $9.00
SHIPPING INSURANCE: (NOT OFFERED) —

TOTAL: $ [ 94.00 ]

YOU SAVED $3.00 ON SHIPPING

RECALCULATE

NOT SURE HOW MUCH TO PAY? REQUEST TOTAL FROM SELLER

[ PAY FOR ITEMS ]

(SHIPPING DISCOUNT CHANGED WARNING MESSAGE)

PLEASE VERIFY THE SHIPPING COST IS ACCURATE. THE SELLER MAY HAVE CHANGED THE SHIPPING DISCOUNT OFFERED

ANNOUNCEMENTS | REGISTER | SAFEHARBOR (RULES & SAFETY) | FEEDBACK FORUM

| FIG. 34A |
|----------|
| FIG. 34B |

BROWSE | SELL | SERVICES | SEARCH | HOME | SITE MAP | SIGN OUT
HELP | COMMUNITY

SELL YOUR ITEM FROM | SELLER GUIDE | SELLER TOOLS

LOST YOUR INFORMATION? CLICK REFRESH. LEARN HOW TO STOP INFORMATION LOSS.

SELL YOUR ITEM: DESCRIBE YOUR ITEM

1 CATEGORY  2 TITLE         3 PICTURES   4 PAYMENT      5 REVIEW
              & DESCRIPTION   & DETAILS    & SHIPPING     & SUBMIT

○ LIVE HELP

☆ = REQUIRED

ITEM TITLE ☆
[                    ]

NO HTML, ASTERISKS, OR QUOTES 45 CHARACTERS MAXIMUM

LEARN HOW TO WRITE A GOOD ITEM TITLE

ITEM DESCRIPTION

| | | | HOME | SITE MAP | SIGN OUT |
| BROWSE | SELL | SERVICES | SEARCH | HELP | COMMUNITY |

COMBINE PURCHASES

GOODDEALS, YOU HAVE PURCHASED A NUMBER OF ITEMS FROM TRADEMASTER. YOU CAN NOW COMBINE THESE PURCHASES INTO A SINGLE PAYMENT. TO DO SO, JUST CLICK THE PAY FOR ITEMS BUTTON

| SELECT | ITEM # | ITEM TITLE | QTY | PRICE | SUBTOTAL |
|---|---|---|---|---|---|
| ☑ | 1003886 | PLAYSTATION 2 PS2 SYSTEM PACKAGE | 1 | $75.00 | $75.00 |
| ☑ | 1003887 | MADDEN NFL 2003-PLAYSTATION 2 PS2 GAME NEW! | 1 | $10.00 | $10.00 |

SUBTOTAL: $85.00
SHIPPING AND HANDLING: $9.00
SHIPPING INSURANCE: (NOT OFFERED) —
TOTAL: $ 94.00
YOU SAVED $3.00 ON SHIPPING
RECALCULATE
NOT SURE HOW MUCH TO PAY? REQUEST TOTAL FROM SELLER

[ PAY FOR ITEMS ]

DON'T SEE A PARTICULAR ITEM YOU PURCHASED FROM THIS SELLER? LEARN MORE

ANNOUNCEMENTS | REGISTER | SAFEHARBOR (RULES & SAFETY) | FEEDBACK FORUM

*FIG. 36*

INVOICING SYSTEM

RELATED APPLICATIONS

This application is a continuation of U.S. Serial application Ser. No. 10/882,633 filed Jun. 30, 2004, now U.S. Pat. No. 7,742,947 which claimed the benefit of U.S. Provisional Application Nos. 60/495,608, filed Aug. 14, 2003 and 60/501,251, filed Sep. 8, 2003, all of which are incorporated herein by reference in their entirety.

TECHNICAL FIELD

The present invention relates generally to the technical field of commerce automation and, in particular, to methods and systems to facilitate generation of invoices combining multiple transactions established utilizing a multi-seller network-based marketplace.

BACKGROUND

Network-based marketplaces have, with the widespread adoption of Internet technologies, become increasingly popular venues for the buying and selling of goods and services. As more and more sellers turn to network-based marketplaces as an important distribution channel, the need to provide invoicing tools to such sellers has increased.

While a number of traditional invoicing tools (e.g., Quickbooks, developed and distributed by Intuit, Inc.) are typically available to sellers, such invoicing tools are typically independent of a marketplace at which a seller may have established transactions. Accordingly, the seller is required manually to input information relating to transactions for which invoices are to be generated.

In order to make a network-based marketplace more attractive to sellers, there is some incentive for an operator of the network-based marketplace to provide invoicing tools that are tightly integrated with the marketplace, and that can automatically retrieve and include information regarding transactions within invoices. However, the design of such integrated invoicing tools presents a number of technical challenges, specifically regarding how the invoices may be customized to accommodate the unique requirements of a particular transaction and of a particular buyer or seller. Further, a number of technical challenges exist with respect to the automation of invoice generation by such invoicing tools, given the large number of the variables that may be associated with a particular transaction.

BRIEF DESCRIPTION OF THE DRAWINGS

The present invention is illustrated by way of example and not limitation in the figures of the accompanying drawings, in which like references indicate similar elements and in which:

FIGS. 7-13, 15-18, 20-28, 31-34 and 36 illustrate exemplary user interfaces (UIs) presented to a user of the marketplace, according to various embodiments of the present invention.

DETAILED DESCRIPTION

A method and system to facilitate generation of invoices combining multiple transactions, established utilizing a multi-seller network-based marketplace, are described. In the following description, for purposes of explanation, numerous specific details are set forth in order to provide a thorough understanding of the present invention. It will be evident, however, to one skilled in the art that the present invention may be practiced without these specific details.

Platform Architecture

Figure 1:
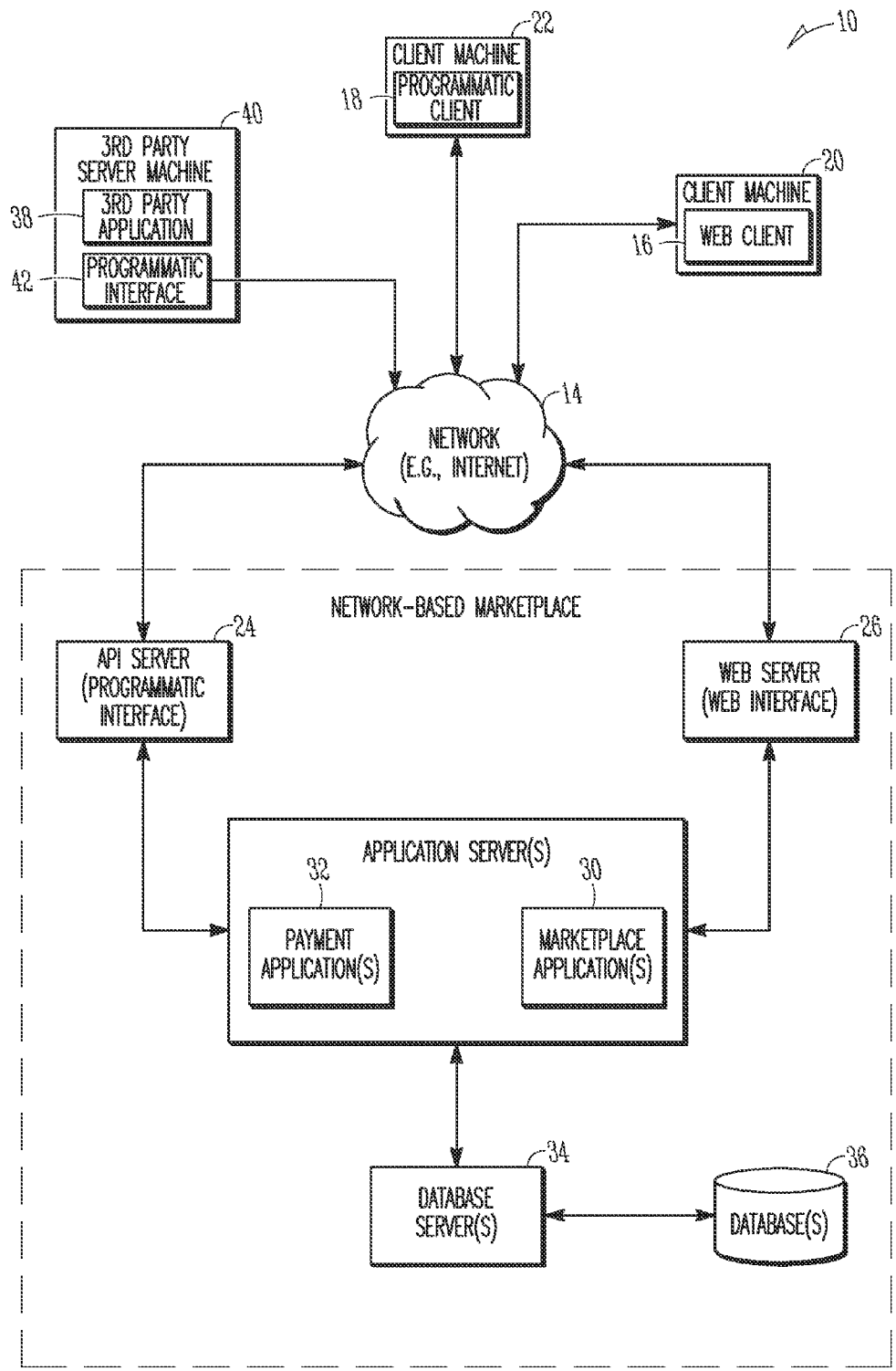
FIG. 1 is a network diagram depicting a commerce system, according to one exemplary embodiment of the present invention.

FIG. 1 is a network diagram depicting a commerce system 10, according to one exemplary embodiment of the present invention, having a client-server architecture. Specifically, a trading platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. In one embodiment, the application servers 28 include a marketplace server hosting one or more marketplace applications 30 and a payment server hosting one or more payment applications 32.

The application servers 28 are coupled to one or more databases servers 34 that facilitate access to one or more databases 36.

The marketplace applications 30 support a number of marketplace functions and services to clients that access the marketplace 12. The payment applications 32 likewise provide a number of payment services and functions to clients that access marketplace 12. While the marketplace and payment applications 30 and 32 are shown in FIG. 1 to both form part of the network-based marketplace 12, it will be appreciated that in alternative embodiments of the present invention, the payment applications 32 may form part of a payment service that is separate and distinct from the marketplace 12.

Further, while the commerce system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via a programmatic interface 40 and the programmatic interface provided by the API server 24. For example, the third party application 38 may, utilizing information retrieved from the network-based marketplace 12, support one or more features or functions on a website hosted by the third party. The third party website may, for example, provide one or more marketplace or payment functions that are supported by the relevant applications of the network-based marketplace 12.

Marketplace Applications

Figure 2:
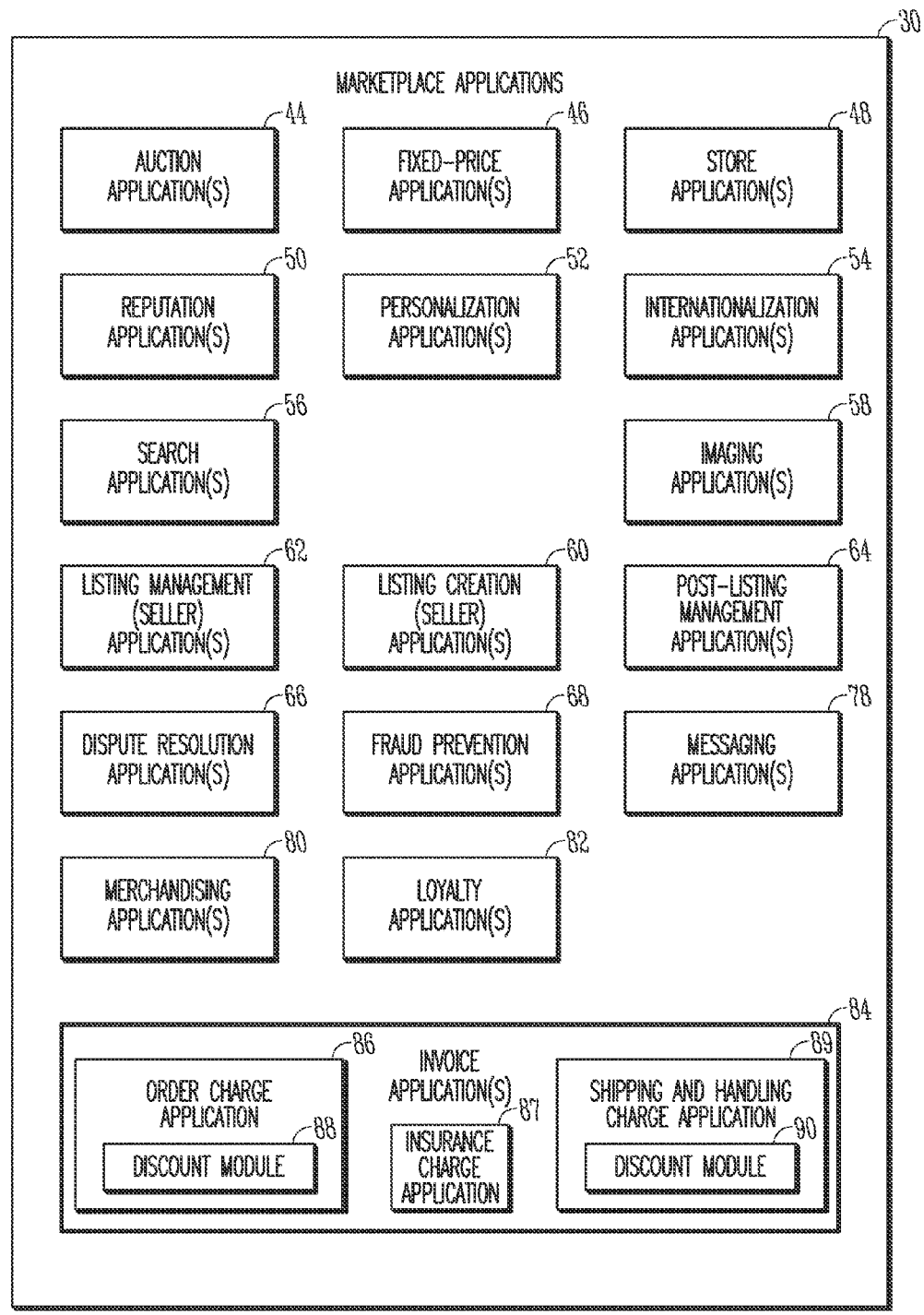
FIG. 2 is a block diagram illustrating multiple market applications provided as part of a network-based marketplace, according to one embodiment of the present invention.

FIG. 2 is a block diagram illustrating multiple market applications 30 that, in one exemplary embodiment of the present invention, are provided as part of the network-based marketplace 12. The marketplace 12 may provide a number of listing and price-setting mechanisms whereby a seller can list goods or services for sale, a buyer can express interest in or indicate a desire to purchase such goods or services, and a price can be set for a transaction pertaining to the goods or services. To this end, the marketplace applications 30 are shown to include one or more auction applications 44 with support auction-format listings and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings may be offered in conjunction with an auction-format listing, and allow a buyer to purchase goods or services, which are also being offered for sale via an auction, for a fixed-price which is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations which may be made available and published to potential trading partners. Specifically, where the network-based marketplace 12 supports person-to-person trading, parties to a transaction may have no history or other reference information whereby trustworthiness and credibility may be ascertained. The reputation applications 50 allow a party, for example through feedback provided by other transaction partners, to establish a reputation over time within the network-based marketplace 12. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user has been a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more search applications 56. For example, a search application enables key word searches of listings published via the marketplace 12. A browse application allows users to browse various category, or catalogue, data structures according to which listings may be classified within the marketplace 12. Various other navigation applications may be provided to supplement the search and browsing applications.

In order to make listings available via the network-based marketplace 12 as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that may be presented to potential buyers. For example, sellers may pay an additional fee to have an image associated with one or more of the listings included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50 so as to allow the seller conveniently to provide feedback regarding multiple buyers to the reputation applications 50.

Dispute resolution applications 66 provide mechanisms whereby disputes that may arise between transacting parties may be resolved. Specifically, the dispute resolution applications 66 may provide guided procedures whereby the parties are guided through a number of steps in an attempt to settle the dispute. In the event that the dispute cannot be settled via the guided procedures, the dispute may escalated to a third party mediator or arbitrator.

A number of fraud prevention applications 68 implement various fraud detection and prevention mechanisms to reduce the occurrence of fraud within the marketplace 12.

Messaging applications 78 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 80 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty applications 82. For example, a buyer may earn loyalty points for each transaction established and/or concluded with a particular seller, and be offered a reward for which accumulated loyalty points can be redeemed.

So as to enable sellers effectively to generate and communicate invoices to buyers, the marketplace applications 30 include one or more invoice applications 84. According to one exemplary embodiment of the present application, the invoice applications 84 may include an order application 86 that allows a user of the network-based marketplace 12 (e.g., a buyer or a seller) conveniently to combine multiple transactions into a single order for invoicing purposes. The invoicing applications 84 may also include a shipping and handling charge application 84 to at least partially automate the calculation of shipping and handling charges in connection with one or more orders, and an insurance charge application 86 to at least partially automate the calculation of insurance charges in connection with an order. The order application 86 is shown to include an order discount module 88, which automatically calculates and applies discounts in connection with various order conditions, and according to stored rules. Similarly, the shipping application 84 is shown to include a shipping discount module 90, which operates automatically to calculate and apply shipping discounts according to stored rules. Further details regarding the exemplary embodiments of the invoice applications 84 are provided below.

Data Structures

Figure 3:
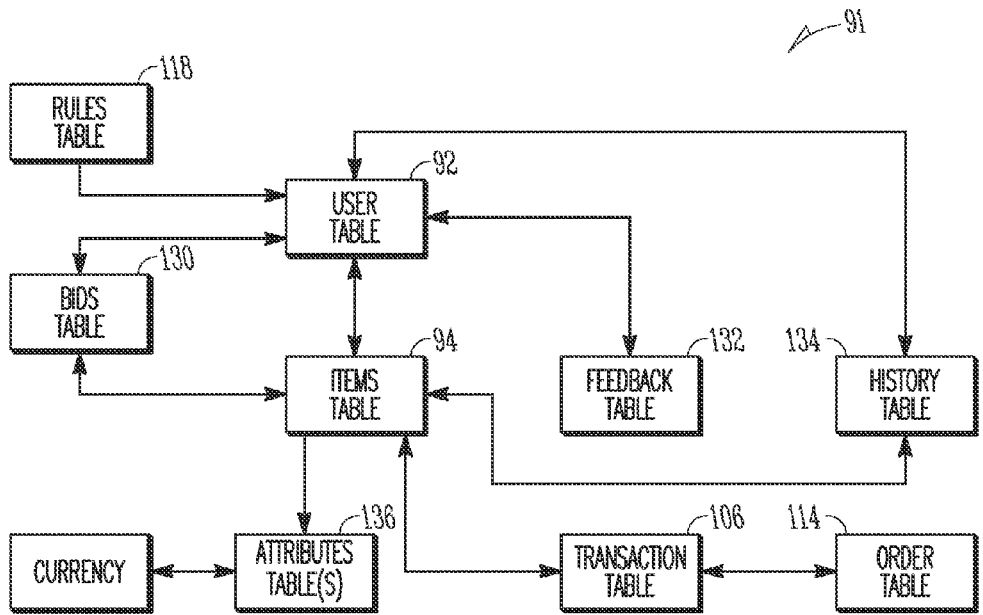
FIG. 3 is a high-level entity-relationship diagram, illustrating various database that may be utilized by and support the marketplace.

FIG. 3 is a high-level entity-relationship diagram, illustrating various tables 91 that may be maintained within the databases 36, and that are utilized by and support the marketplace 12 and payments applications 30 and 32. A user table 92 contains a record for each registered user of the network-based marketplace 12, and may include identifier, address and financial instrument information pertaining to each such registered user. A user may, it will be appreciated, may operate as a seller, a buyer, or both, within the network-based marketplace 12.

The tables 91 also include an items table 94 in which is maintained an item record for each item or service that is available to be, or has been, transacted via the marketplace 12. Each item record within the items table 94 may furthermore be linked to one or more user records within the user table 92, so as to associate a seller and one or more actual or potential buyers with each item record.

Figure 4:
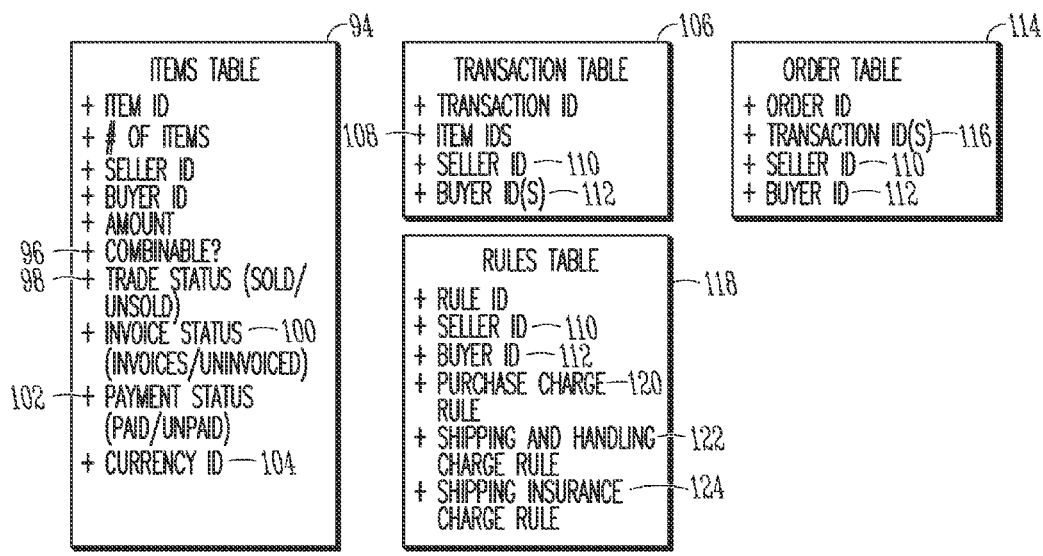
FIG. 4 shows various fields of database tables.

FIG. 4 shows various fields that may be supported for each record within the items table 94. Particularly pertinent to the exemplary embodiment of the present invention, it will be noted that each item record may include a "combinable" field 96, which may record an indication, provided by a seller, that a transaction pertaining to the relevant item is combinable with other transactions for the purposes of a creating a single order. Trade status, invoice status, payment status and currency identifier fields 98-104 may also be utilized by an invoice application 84, as described below, in the generation of an invoice pertaining to an order.

Referring to FIG. 3, the tables 91 also include a transaction table 106, which contains a record for each transaction (e.g., a purchase transaction) pertaining to items for which records exist within the items table 94. Specifically, a transaction record in connection with a particular item may be created in the transaction table 106 upon the establishment of an agreement between a buyer and seller to exchange value in connection with a particular good or service.

As illustrated in FIG. 4, each record within the transaction table 106 may include an item identifier 108 that links to an item record within the items table 94, a seller identifier 110 and a buyer identifier 112, each of the seller and buyer identifiers 110 and 112 linking to a user record within the user table 92. It should be noted that multiple transaction records within the transaction table 106 might link back to a single item record within the items table 94, where that single item record relates to a multi-quantity item.

An order table 114 is populated with order records, each order record being associated with an order. Each order, in turn, may be with respect to one or more transactions for which records exist within the transactions table 106. As such, a particular order record within the order table 114 may reference multiple transaction identifiers 116. In the exemplary embodiment, each order record may indicate only a single buyer-seller pairing, this buyer-seller pairing being identified by the seller and buyer identifiers 110 and 112.

The tables 91 are also shown to include a rules table 118, which is shown to be linked to the user table 92. Specifically, the rules table 118 is populated with rule records, each rule record identifying various charge rules that are associated with users of the network-based marketplace 12. Referring specifically to FIG. 4, it will be noted that each rules record includes seller identifier and buyer identifier fields 110 and 112. Accordingly, a particular rule may be associated with a user in the role of a buyer or a seller. For example, a particular charge rule may be associated with a particular user when that user operates in a buyer role at the marketplace 12, and a different charge rule may be associated with the particular user when that user operates in a seller role at the marketplace 12.

Each rule record within the rules table 118 may also record a purchase charge rule 120, a shipping and handling charge rule 122, and a shipping insurance charge rule 124. An invoice application 84 references the rules 120-124 when calculating total charges for an order, to be reflected in an invoice. Accordingly, the rules 120-124 allow a user's preferences to be reflected in the automated (or at least partially automated) calculation of total charges in connection with an order. Specifically, a purchase charge rule 120 may specify a charge calculation rule to be invoked with respect to purchases involving an identified user. For example, a user, when acting in the capacity of a seller, may specify a purchase charge rule 120 in terms of which a discount (e.g., a percentage off a total purchase price) is offered when a buyer purchases multiple items. Similarly, a shipping and handling charge rule 122 may specify how shipping and handling charges are calculated with respect to items purchased from the user, when acting in the capacity of a seller. In one exemplary embodiment of present invention, such shipping and handling charge rules 122 include actual rate shipping charge rules and flat rate shipping charge rules, each rule type being customizable by a seller to reflect the seller's preferences. Further details regarding exemplary shipping and handling charge rules 122 are provided below. A shipping insurance charge rule 124 similarly reflects user preferences with respect to the calculation of shipping insurance charges, and may be invoked by an invoice application 84 to at least partially automate the calculation of such charges when generating an invoice.

FIG. 3 also illustrates the tables 91 as including a bids table 130. Each bid record within the bids table 130 relates to a bid received at the network-based marketplace 12 in connection with an auction form of listing supported by an auction application 44. A feedback table 132 is utilized by one or more reputation applications 50, in one exemplary embodiment, to construct and maintain reputation information concerning users. A history table 134 maintains a history of transactions to which a user has been a party. One or more attributes tables 136 record attribute information pertaining to items for which records exist within the items table 94. Considering only a single example of such an attribute, the attributes tables 136 may indicate a currency attribute associated with a particular item.

Invoices Combining Multiple Transactions

Figure 5:
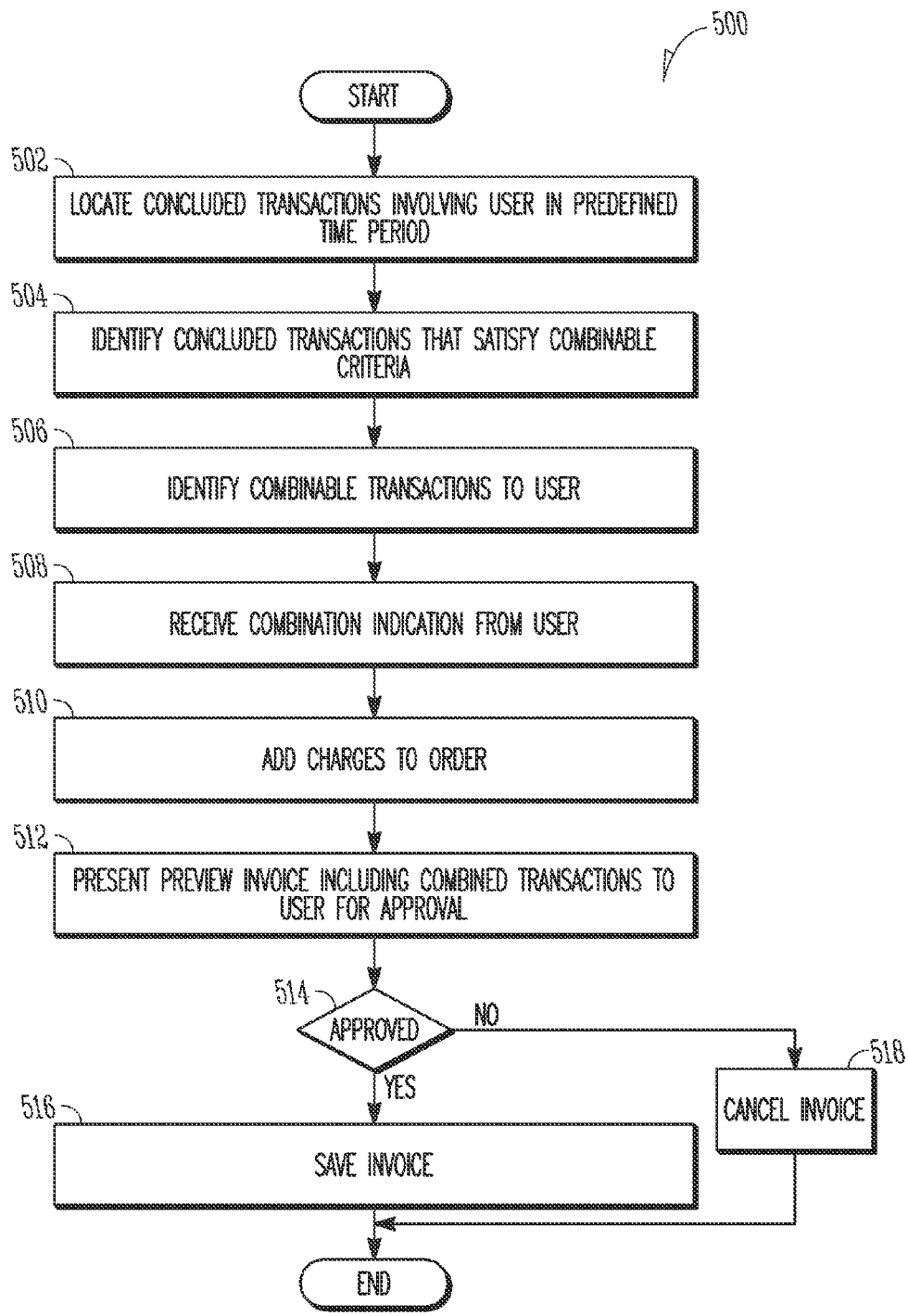
FIG. 5 is a flow diagram of one embodiment of a process for creating invoices combining multiple transactions established utilizing a network-based marketplace.

FIG. 5 is a flow diagram of one embodiment of a process 500 for creating invoices combining multiple transactions established utilizing a network-based marketplace. Process 500 may be performed by processing logic, which may comprise hardware, software, or a combination of both. In one embodiment, processing logic resides in a payment server (e.g., one of the application servers 28 of FIG. 1).

Referring to FIG. 5, process 500 begins with processing logic locating concluded transactions involving a first user in a predefined time period (processing block 502). A transaction is concluded when an agreement is established between two parties (e.g., a buyer and a seller) to exchange value in connection with an item (e.g., a good or a service) or multiple quantities of an item. The first user may represent either of the two parties. A predefined time period may systematically defined or specified by the first user. In one embodiment, processing logic locates concluded transactions by searching a transaction table 106 of FIG. 3.

At processing block 504, processing logic identifies concluded transactions that satisfy combinable criteria. The combinable criteria may require, for example, that the transactions be from a common buyer and a common seller, be unpaid, be associated with the same currency and/or the same marketplace site (a marketplace customized for the same geographic region), etc. The combinable criteria may be configurable based on a specific marketplace or a marketplace site.

At processing block 506, processing logic identifies the combinable transactions to the first user. For example, processing logic may identify the combinable transactions by displaying them to the first user with a combinability indicator (e.g., an icon), providing a link to a screen displaying each or all subsets of the identified combinable transactions, requesting the first user to specify his or her trading partner and displaying all combinable transactions between the first user and the trading partner, etc.

At processing block 508, processing logic receives data indicating the first user's approval for consolidating a subset of combinable transactions into a single order. For example, processing logic may receive the data indicating the first user's approval when the first user selects two or more transactions from a displayed subset of combinable transactions and clicks a designated button (e.g., a send invoice button or a combine items button, a pay now button, etc.) on the screen. In another embodiment, the invoice may include multiple subsets of combinable transactions associated with the first user and different trading partners of the first user. In yet another embodiment, the invoice may include one or more subsets of combinable transactions and one or more individual transactions associated with the first user and different trading partners of the first user.

At processing block 510, processing logic adds charges to the order with combined transactions. The charges may include, for example, shipping costs, shipping insurance costs, etc. The charges may include a discount for consolidating combinable transactions into a single order. In one embodiment, the charges are applied based on rules specified by the seller. In another embodiment, the charges are applied based on rules established in the network-based marketplace. In yet another embodiment, the charges are applied based on input provided by the first user for the current order. In still another embodiment, the charges are applied based on input provided by the trading partner for the current order in response to the first user's request for this input.

Next, processing logic creates a preview invoice for the order, presents the preview invoice to the first user (processing block 512), and asks the first user to approve the preview invoice. If the first user approves the invoice (decision box 514), processing logic saves the invoice (processing block 516) and, in one embodiment, notifies the trading partner about the invoice. If the first user does not approve the invoice, processing logic cancels the invoice for the order (processing block 516) and, in one embodiment, creates an individual invoice for each transaction in the order.

In one embodiment, an order combining multiple transactions may be created either by a seller or a buyer. In one embodiment, an order has a specific state. For example, an order may be active, inactive, complete, or cancelled. An active order is the most recent order created by either the buyer or seller. A transaction may only be part of a single active order at any given time. An inactive order is an order that became inactive because either (a) the seller has uncombined a seller created active order, (b) the buyer has uncombined a seller created active order, or (c) the buyer has created a new order replacing a previous buyer created active order. A complete order is an order paid by the buyer (e.g., when the buyer completes checkout or pays through an electronic payment service on an active or inactive order). An order is cancelled when any of its transactions no longer satisfy the combinable criteria. For example, an order containing an item for which the buyer has made a payment is marked as cancelled.

In one embodiment, a buyer is allowed to create an order with combinable transactions that are not part of an existing active seller-created order or a complete order. If the buyer creates an order that consists of transactions from an existing active buyer-created order, this existing order is marked as inactive. The transactions may only be associated with a single active order. A seller is allowed to create an order with combinable transactions that are not part of a complete order. If the seller creates an order with combinable transactions that are part of an existing active buyer-created order, this buyer-created order is marked as inactive, and its transactions are associated to the new active seller-created order.

In one embodiment, a buyer can pay for any order that is not marked as complete. Any active or inactive order may be checkout or paid through the electronic payment service by the buyer. If the buyer completes checkout or pays through the electronic payment service on an active order, the status of the order is marked as completed. If the buyer completes checkout or pays through the electronic payment service on an inactive order, the status of the inactive order is marked as completed. For example, if the buyer first creates the order and proceeds to pay at the electronic payment service, and then the seller creates an order with the same items prior to the buyer completing the payment, the buyer-created order is marked as inactive, and the transactions are associated to the active seller-created order.

In one embodiment, each order is referenced by a unique sales record number associated with a seller.

Figure 6:
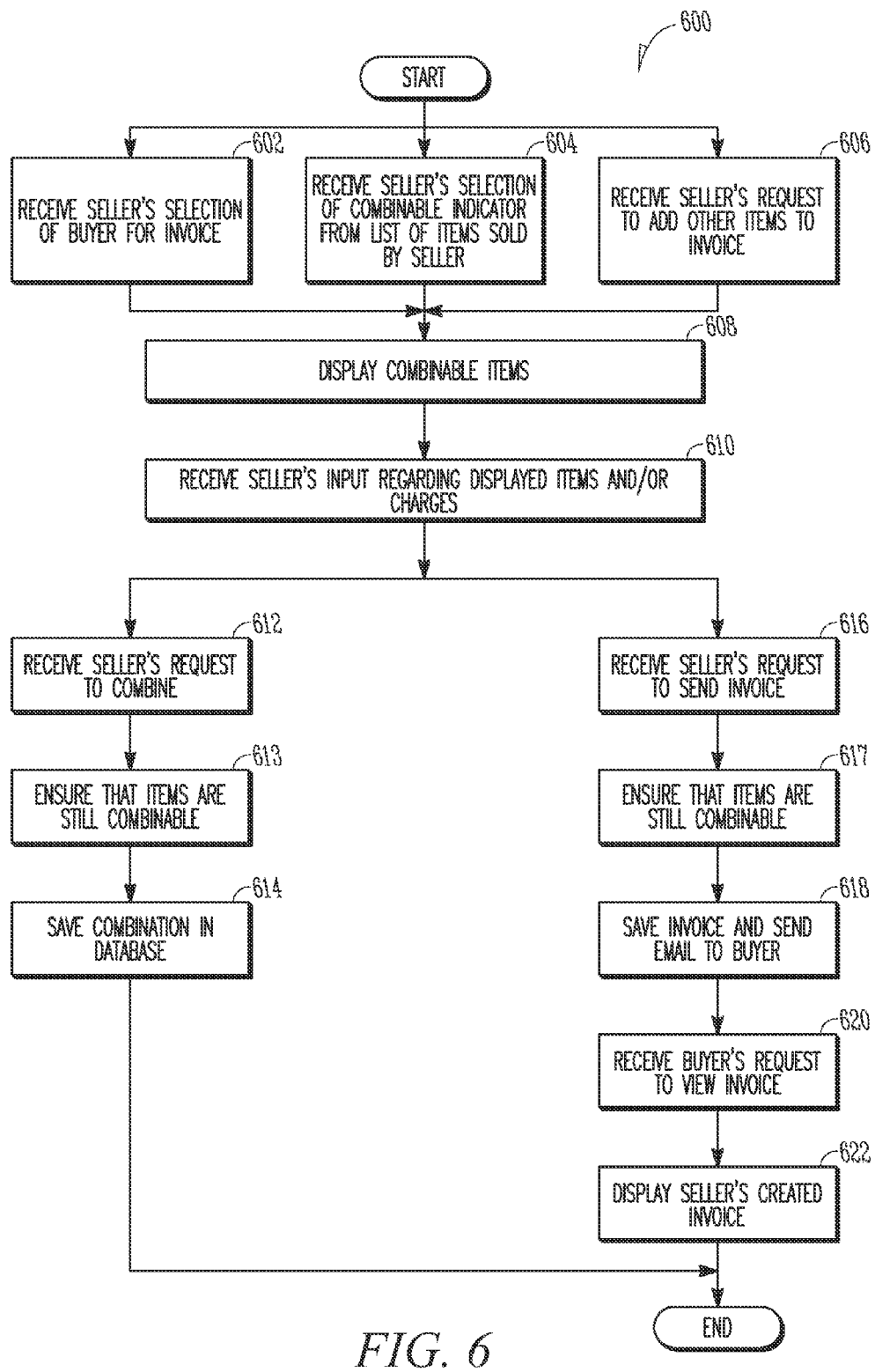
FIGS. 6 and 14 are block diagrams of two alternative embodiments of a seller-initiated process for generating invoices consolidating multiple items.
Figure 14:
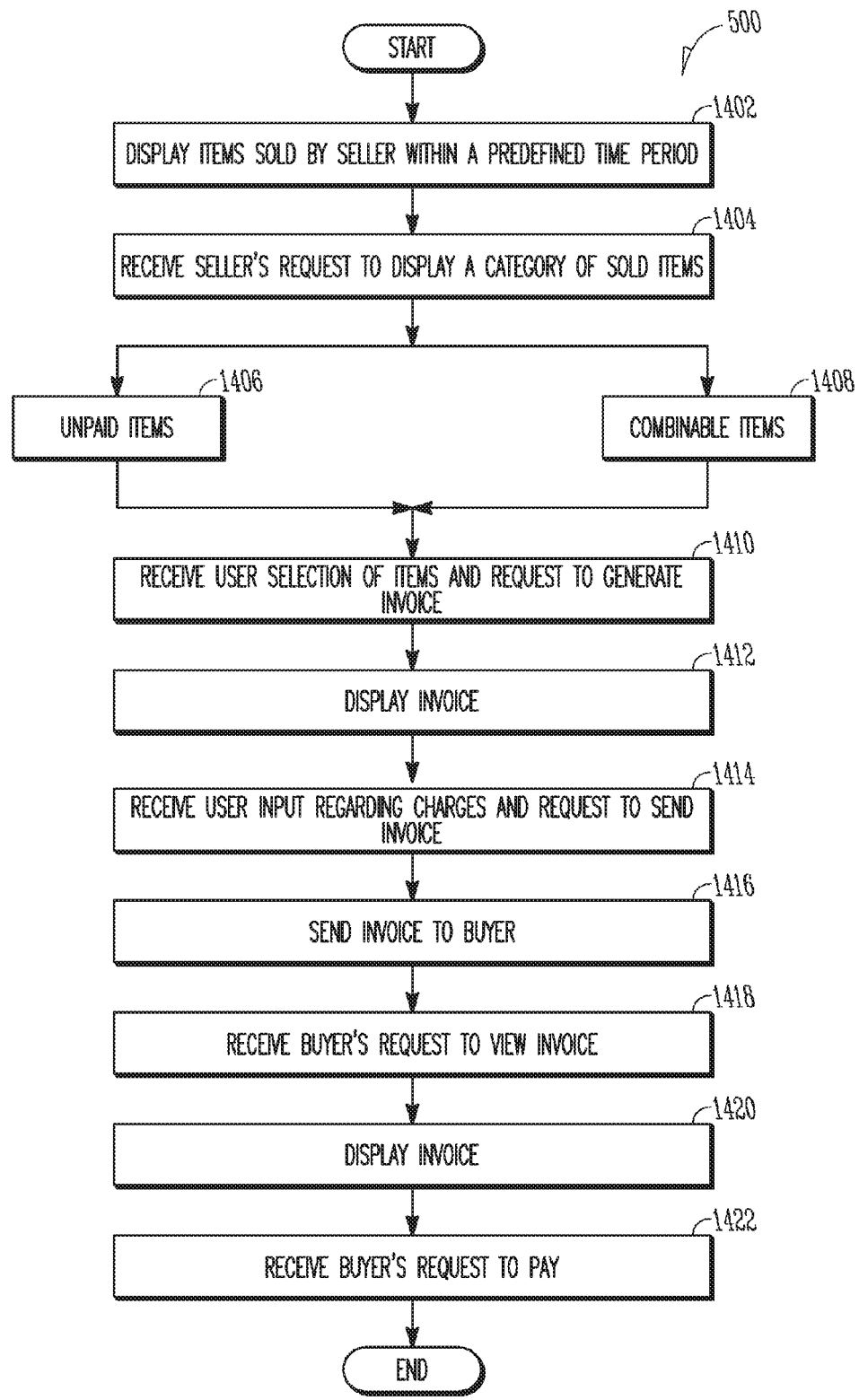

FIGS. 6 and 14 are block diagrams of two alternative embodiments of a seller-initiated process for generating invoices consolidating multiple items. The process may be performed by processing logic, which may comprise hardware, software, or a combination of both.

Referring to FIG. 6, process 600 will be described in conjunction with exemplary user interfaces illustrated in FIGS. 7-13. In one embodiment, processing logic of process 600 resides in a payment server (e.g., one of the application servers 28 of FIG. 1).

Process 600 may start with any one of processing blocks 602, 604 and 606. At processing block 602, processing logic receives data identifying a seller's selection of a buyer for whom the invoice should be generated. In one embodiment, processing logic identifies subsets of items purchased from the seller that can be combined based on the combinability criteria, presents to the seller a user interface (UI) that displays a list of buyers who purchased combinable items from the seller, and allows the seller to select a specific buyer. When processing logic receives the seller's selection of the specific buyer, it proceeds to processing block 608 where a list of items purchased from the seller by the selected buyer is displayed. FIG. 7 illustrates an exemplary UI (Select a Buyer to Invoice UI) that allows a seller to specify a buyer for whom the invoice should be generated.

Figure 8:
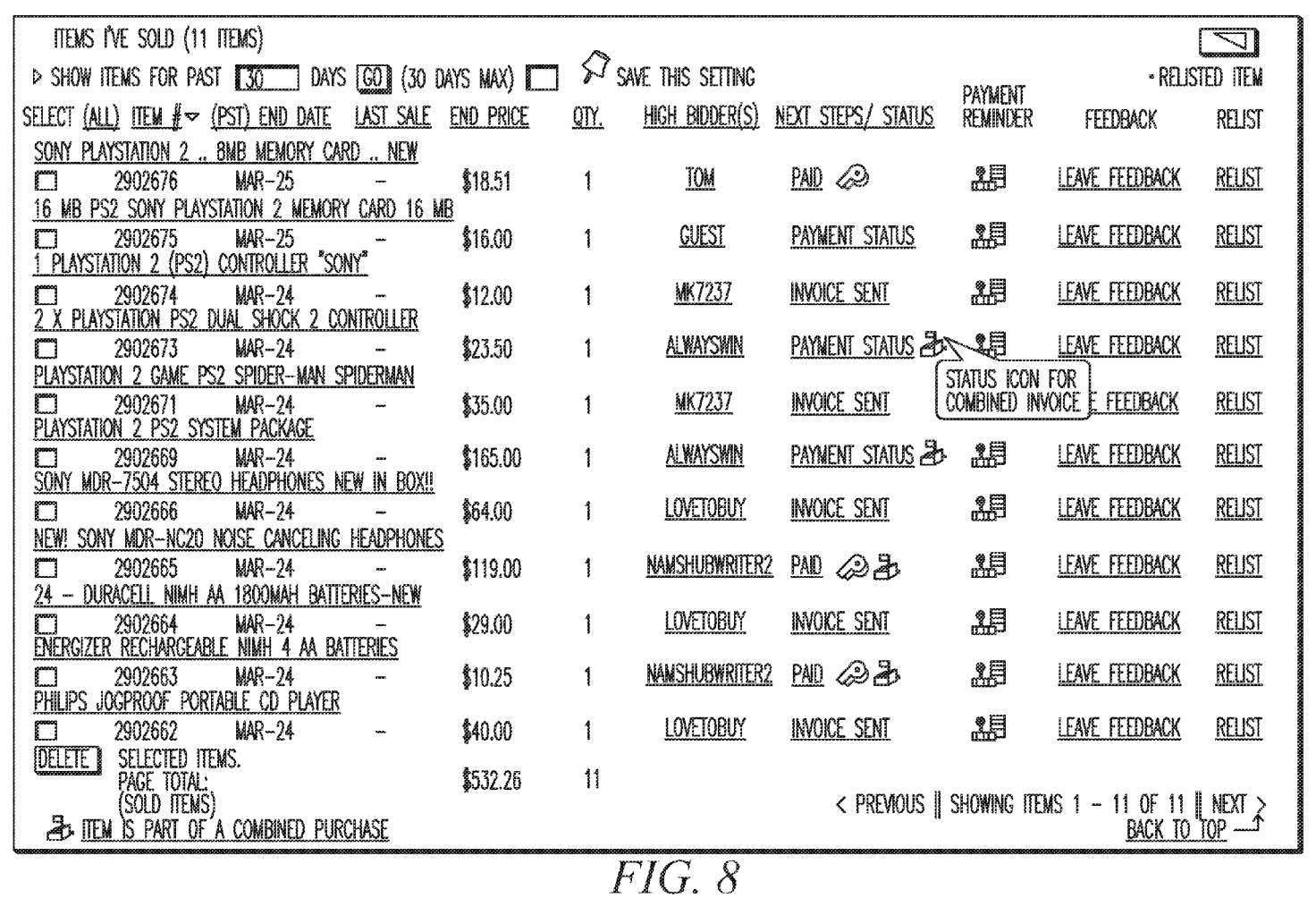

At processing block 604, processing logic receives the seller's selection of a combinability indicator associated with an item purchased from the seller. In one embodiment, processing logic identifies subsets of items purchased from the seller that can be combined based on the combinability criteria, displays a list of items purchased from the seller within a certain time period (e.g., as specified by the seller) with each combinable item having a combinability indicator (e.g., a designated icon), and allows the seller to select a combinability indicator of a specific item. When processing logic receives the seller's selection of a combinability indicator of a specific item, it proceeds to processing block 608 where a list of items that can be combined with the specific item is displayed. FIG. 8 illustrates an exemplary UI (Items I've Sold UI) that presents each combinable item with an icon and allows a seller to select an icon of a specific item to view the items combinable with the specific item.

Figure 9:

At processing block 606, processing logic receives the seller's request to add other items to the invoice being created. In one embodiment, processing logic identifies items that can be combined, based on the combinability criteria, with the item for which the invoice is being created, and provides on the invoice page a link to a list of items that can be combined with the item on the invoice. When processing logic receives the seller's selection of the link, it proceeds to processing block 608 where a list of items that can be combined with the item on the invoice is displayed. FIG. 9 illustrates an exemplary UI (Send Invoice UI) that includes a link to a list of items combinable with the displayed item.

Figure 10A:
Figure 10B:

At processing block 608, processing logic displays a list of combinable items and allows the seller to modify this list (e.g., by removing some items from the list). At processing block 610, processing logic receives the seller's input regarding the displayed items and, in one embodiment, allows the seller to specify charges for the items (e.g., shipping and handling charges, shipping insurance, etc.). In another embodiment, processing logic calculates charges for the items based on rules specified by the seller or standard rules maintained within the marketplace. FIGS. 10A and 10B illustrate exemplary ills (Combine Purchases UI and Send Invoice UI) that allow the seller to check items to be combined in the invoice, specify charges (shipping and handling charges, shipping insurance, and sales tax) for the combined items, enter payment instructions for the buyer, and specify payment methods acceptable to the seller.

Next, upon receiving the seller's request to combine the specified items (e.g., via the Combine Purchase UI) (processing block 612), processing logic ensures that the items are still combinable (i.e., satisfy the combinable criteria) (processing block 613), and saves the resulting order in a database (processing block 614). One or more items may no longer satisfy the combinable criteria if, for example, the buyer has paid or completed the checkout on the items during the seller's interaction with the UI, or the seller has created another active order containing the items using a different browser window. Then, processing logic removes the items that no longer satisfy the combinable criteria from the order and asks the seller to review the remaining items.

The order saved in the database is subsequently retrieved from the database in response to the seller's request to send the invoice for the order to the buyer.

Figure 11:
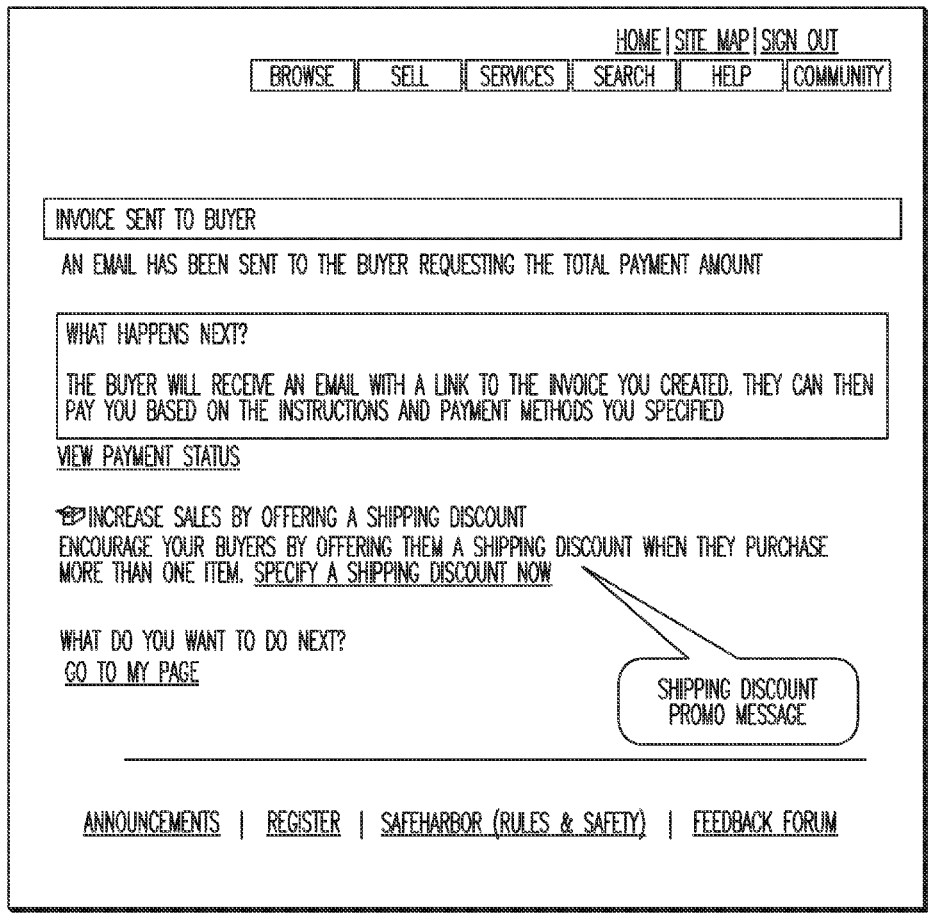

Alternatively, processing logic may receive the seller's request to send the invoice when receiving the seller's input regarding the displayed items and the applicable charges (e.g., via the Send Invoice UI) (processing block 616). Then, processing logic ensures that the items in the invoice are still combinable (i.e., satisfy the combinable criteria) (processing block 617), saves the invoice in the database and sends an email to the buyer, including a link to a page displaying the invoice (processing block 618). FIG. 11 illustrates an exemplary UI (Invoice Sent to Buyer UI) that informs the seller that an email with a link to the invoice was sent to the buyer.

Figure 12:
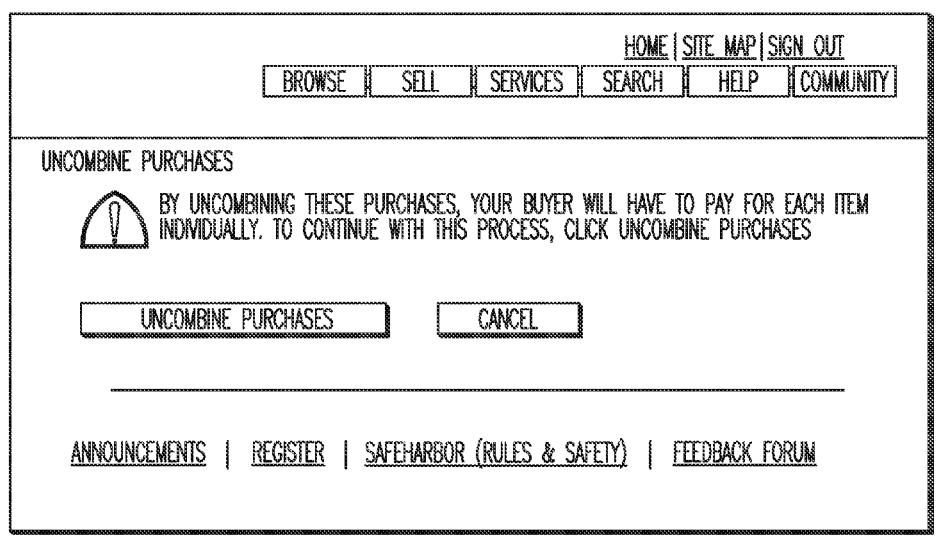

In one embodiment, the seller may request to uncombine items included in the saved order or invoice. FIG. 12 illustrates an exemplary UI (Uncombine Purchases UI) allowing the seller to request that the items from the order or invoice be uncombined.

Further, upon receiving a buyer's request to view the invoice (e.g., the buyer's selection of the link to the invoice in the email) (processing block 620), processing logic displays the seller's created invoice to the buyer (processing block 622). FIG. 13 illustrates an exemplary UI (Pay Now for Multiple Items UI) that displays the content of the invoice to the buyer and allows the buyer to pay for the entire order or for each item individually.

FIG. 14 is a block diagram of an alternative embodiment of a seller-initiated process 1400 for generating invoices consolidating multiple items. Process 1400 will be described in conjunction with exemplary user interfaces illustrated in FIGS. 15-18. In one embodiment, processing logic of process 1400 resides in a payment service system providing payment services to multiple network-based marketplaces, including the marketplace 12 of FIG. 1.

Figure 15A:
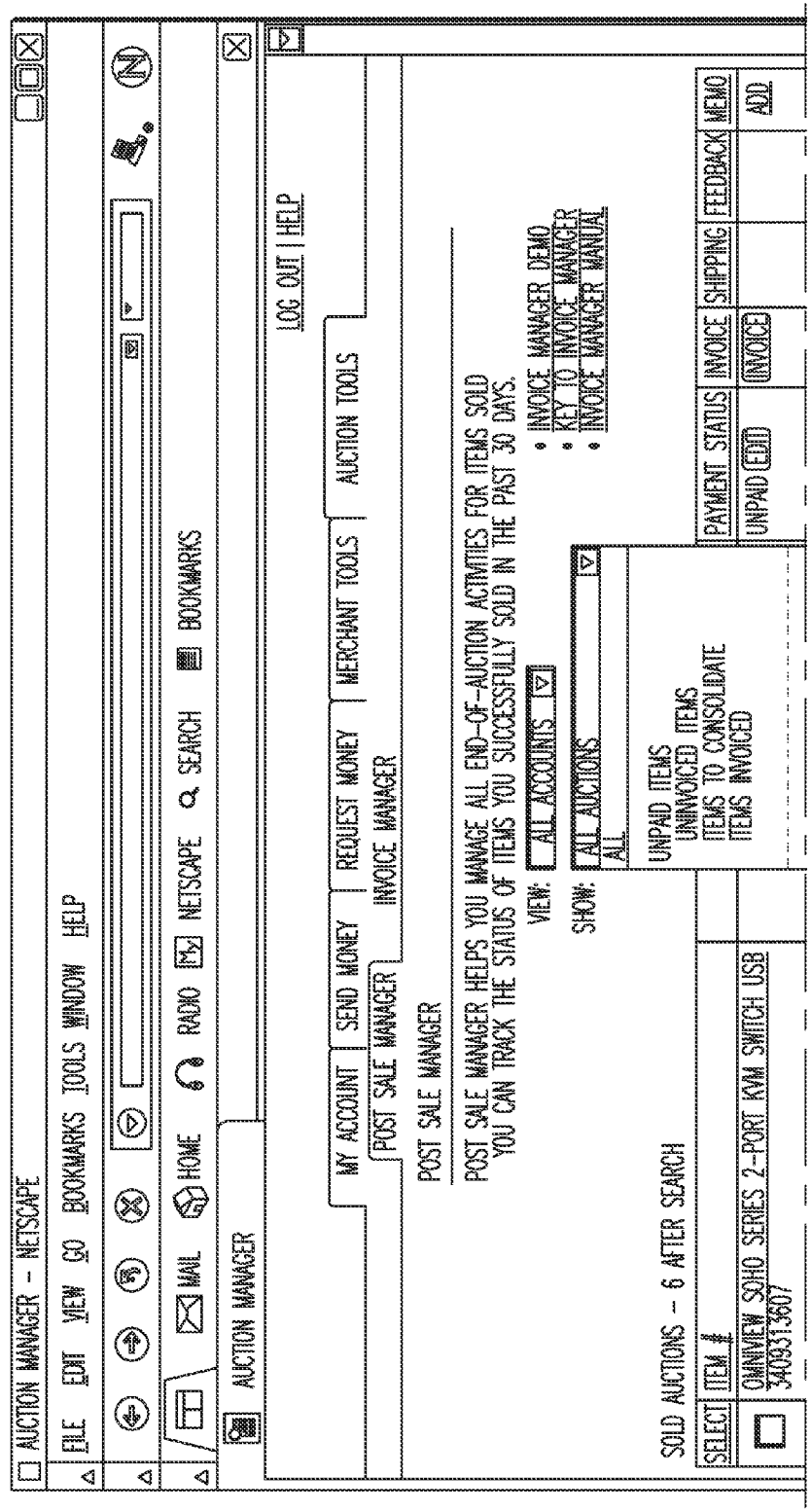
Figure 15B:

Referring to FIG. 14, process 1400 begins with processing logic displaying items sold by a seller within a predefined time period (processing block 1402). FIG. 15 illustrates an exemplary UI (Post Sale Manager UI) that presents items sold by a seller in the past 30 days and a set of filters allowing the seller to view different categories of items sold by the seller (e.g., all items, unpaid items, paid items, unpaid uninvoiced items, unpaid combinable items, unpaid invoiced items, etc.).

At processing block 1404, processing logic receives seller's request to display a specific category of items sold by the seller (e.g., using a filter provided by the Post Sale Manager UI). In response, processing logic displays the items of the specified category. In the discussed embodiment, processing logic may display all unpaid items (processing block 1406) or combinable items that satisfy combinable criteria (processing block 1408). The combinable criteria may require, for example, that the combinable items include subsets of multiple unpaid items that have a common seller and a common buyer.

Figure 16B:

Next, processing logic receives data identifying the seller's selection of items for the invoice and a request to generate the invoice (processing block 1410). FIG. 16 illustrates an exemplary UI (Invoice Manager UI) that presents unpaid items sold by the seller, allows the seller to select items for the invoice (e.g., one or more subsets of combinable items and/or individual items) and to send a request to create the invoice. The seller may request to invoice a single buyer for different items or multiple buyers for different items.

Figure 17C:
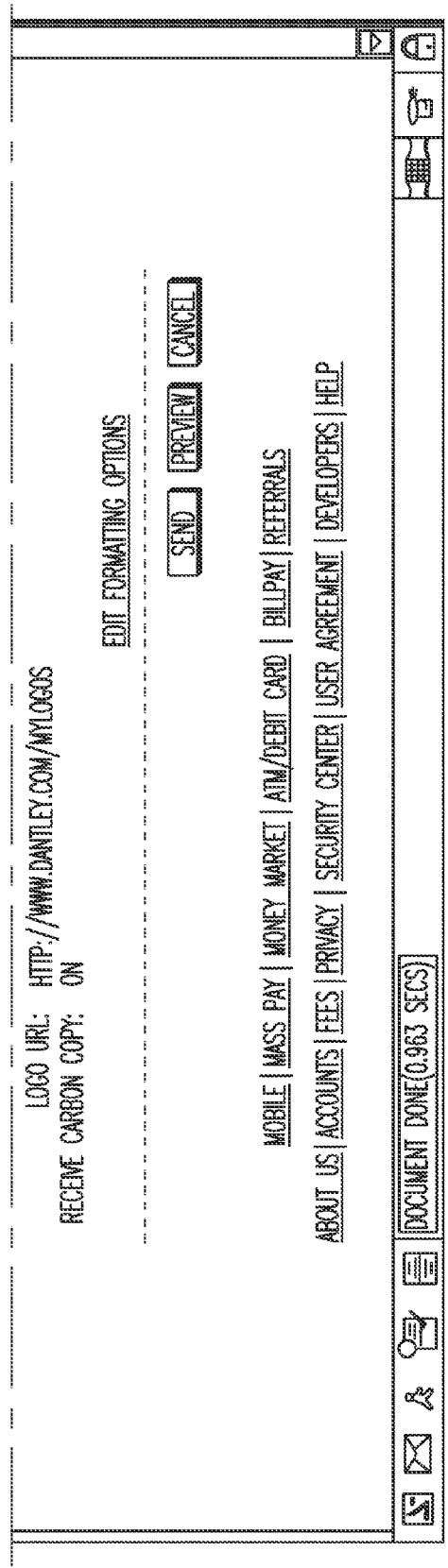

Further, processing logic ensures that the selected items are still unpaid, creates the invoice, and sends the invoice to one or more buyers upon a seller request to send the invoice (processing block 1416). FIG. 17 illustrates an exemplary UI that presents the invoice to the seller and allows the seller to specify charges for each subset of combinable items or each individual transaction and to issue a request to send the invoice to one or more buyers. If the invoice is sent to multiple buyers, each buyer can only view an invoice portion that is relevant to this buyer.

Figure 18B:
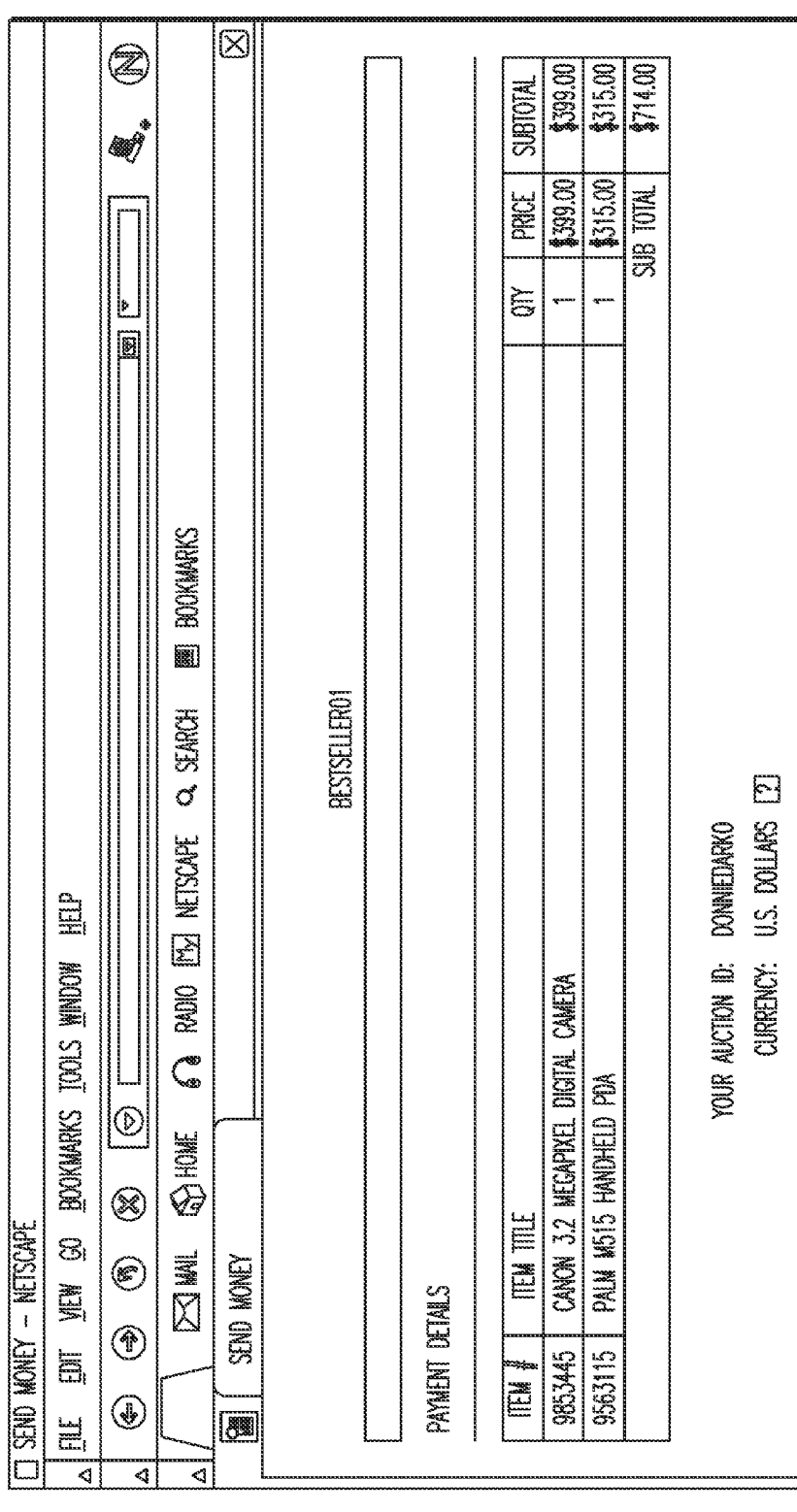
Figure 18B:
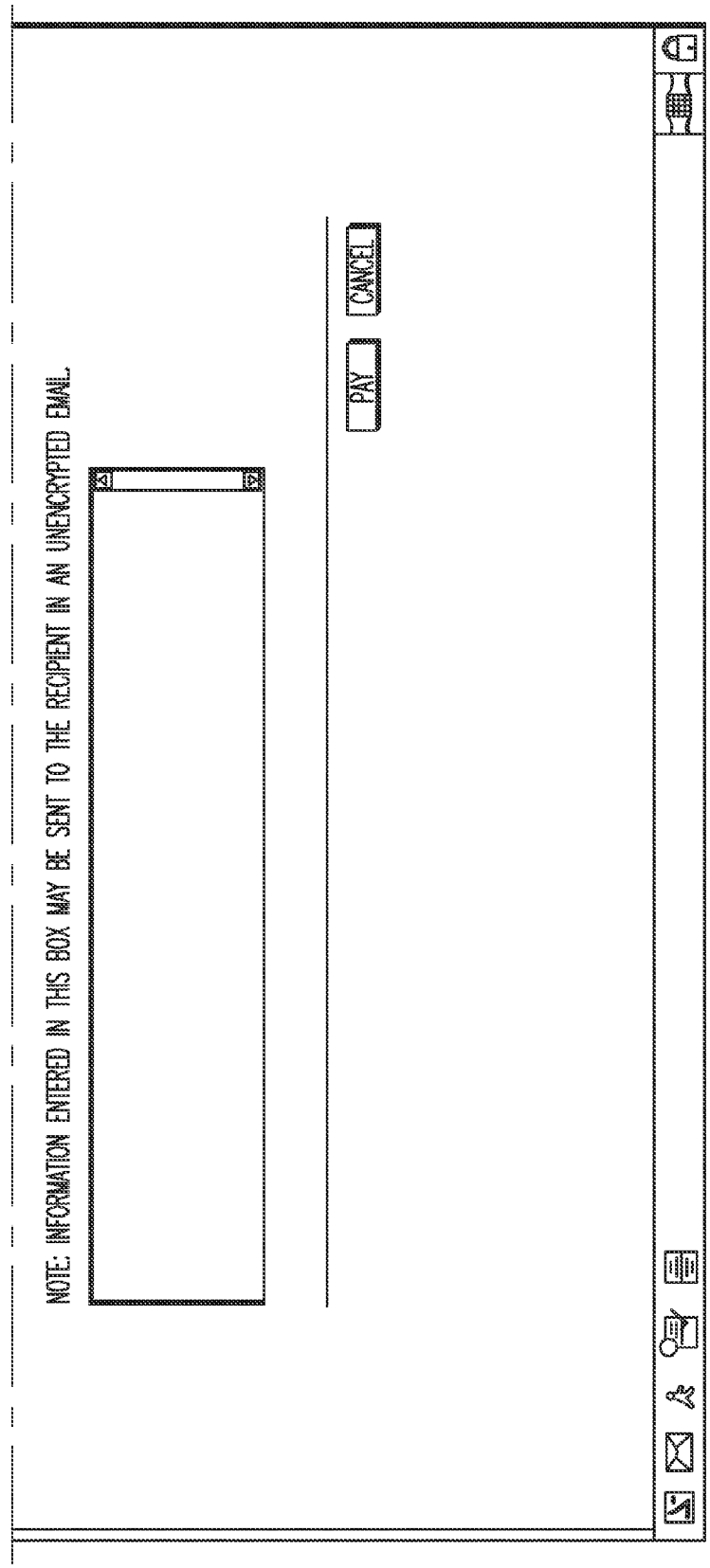

At processing block 1418, processing logic receives the buyer's request to view the invoice (e.g., upon the buyer's selection of an invoice link in an email sent to the buyer). In response, processing logic displays the invoice to the buyer (processing block 1420). FIGS. 18A and 18B illustrate exemplary UIs (Payment Details UI) that present the invoice to the buyer.

At processing block 1422, processing logic receives the buyer's request to pay for the items (e.g., via a pay button on the Payment Details UI of FIG. 18B) and processes the payment.

Figure 19:
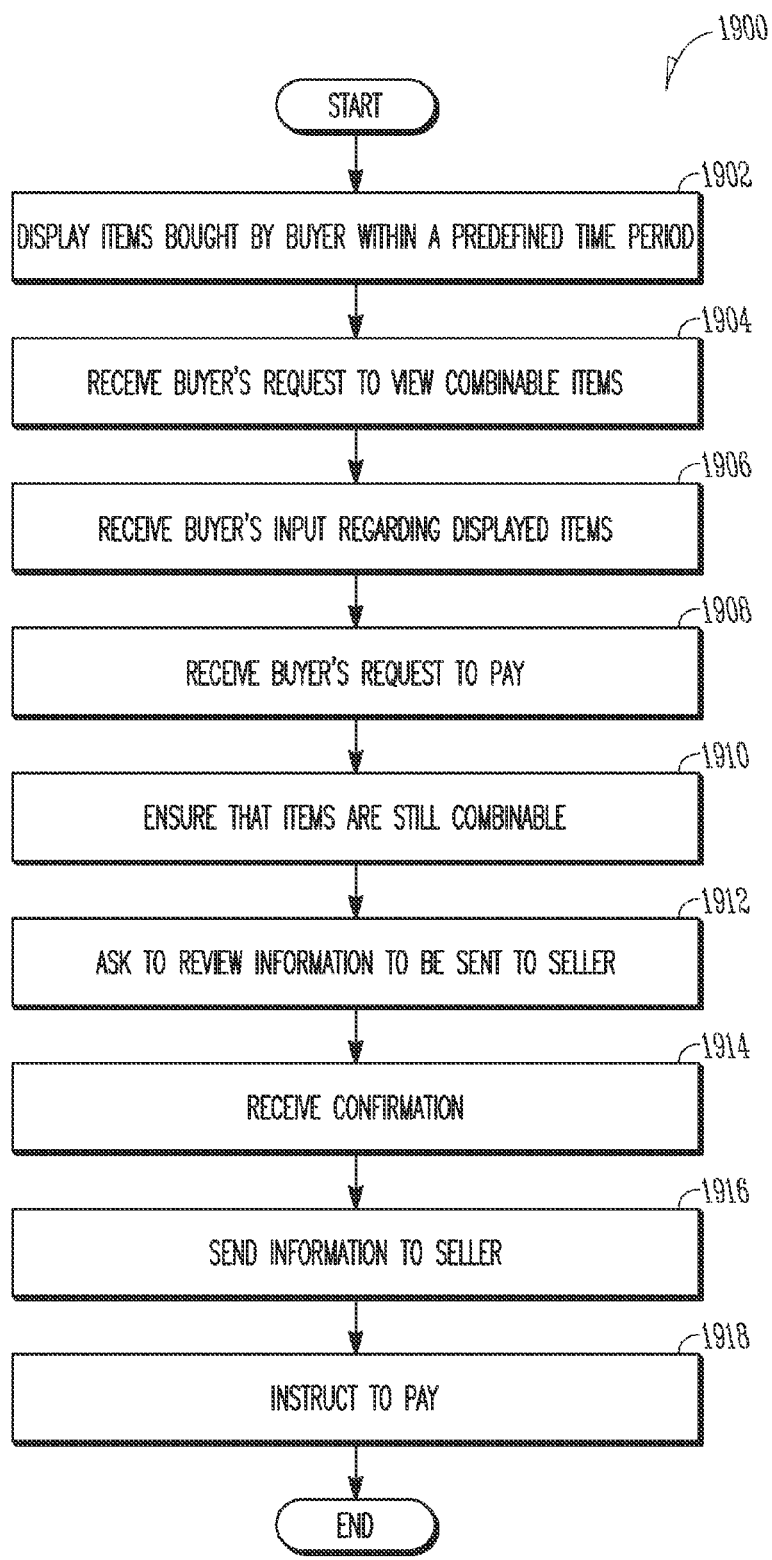
FIG. 19 is a block diagram of one embodiment of a buyer-initiated process for generating invoices consolidating multiple items.

FIG. 19 is a block diagram of one embodiment of a buyer-initiated process 1900 for generating invoices consolidating multiple items. The process may be performed by processing logic, which may comprise hardware, software, or a combination of both. In one embodiment, processing logic resides in a payment server (e.g., one of the application servers 28 of FIG. 1). Process 1900 will be described in conjunction with exemplary user interfaces illustrated in FIGS. 20-23.

Referring to FIG. 19, process 1900 begins with processing logic displaying items purchased by a buyer within a certain time period (e.g., as specified by the buyer) with each combinable item having a combinability indicator (e.g., a designated icon) (processing block 1902). FIG. 20 illustrates an exemplary UI (Items I've Won UI) that presents each combinable item with an icon and allows a buyer to select an icon of a specific item to view the items combinable with the specific item.

At processing block 1904, processing logic receives the buyer's request to view a list of combinable items. In one embodiment, processing logic receives the buyer's request to view a list of combinable items when the buyer selects a combinability indicator of a specific item purchased from a seller.

Figures 21, 22:

In response, processing logic displays the combinable items purchased from the seller, receives the buyer's input identifying items to be combined into a single order (processing block 1906) and calculates charges for the combined items. In one embodiment, processing logic calculates charges for the items based on rules specified by the seller or standard rules maintained within the marketplace. FIG. 21 illustrates an exemplary UIs (Combine Purchases UI) that allows the buyer to check items to be combined in the invoice, displays charges (shipping and handling charges, shipping insurance, and sales tax) for the combined items, and allows the buyer to issue a request to pay for the items.

Next, processing logic receives the buyer's request to pay for the combined items (processing block 1908), ensures that the items are still combinable (i.e., satisfy the combinable criteria) (processing block 613), creates an order including the combined items, and saves the order in the database.

One or more items from the order may no longer satisfy the combinable criteria. Then, processing logic informs the buyer and offers the buyer to pay for the items individually, or removes the items that no longer satisfy the combinable criteria from the order and asks the buyer to review the remaining items. FIG. 22 illustrates an exemplary UI displaying a message informing the seller that one or more items from the order are no longer combinable.

Further, processing logic asks the buyer to review order information to be sent to the seller (processing block 1912), and, upon receiving an approval of the order information from the buyer (processing block 1914), sends the order information to the seller (processing block 1916). FIG. 23A illustrates an exemplary UI (Send Information to Seller UI) displaying the order information and asking the buyer to confirm that the order information is correct.

Afterwards, processing logic instructs the buyer to pay for the order (processing block 1918). FIG. 23B illustrates an exemplary UI (Send Payment to Seller UI) displaying payment information and asking the buyer to make the payment.

In one embodiment, the buyer may request an invoice total from a seller prior to confirming the combination of items or verifying the correctness of information to be sent to the seller. FIG. 24 illustrates an exemplary UI (Request Total from Seller UI) displaying the combined items and asking the buyer to verify his or her shipping address to allow the seller to calculate charges for this order.

Figure 25B:

In one embodiment, a buyer or a seller can request the payment status of an order. FIGS. 25A and 25B illustrate exemplary UIs (Buyer's Payment Status UI and Seller's Payment Status UI) displaying the order information and the payment status of the order for a buyer and seller respectively.

Figure 26B:
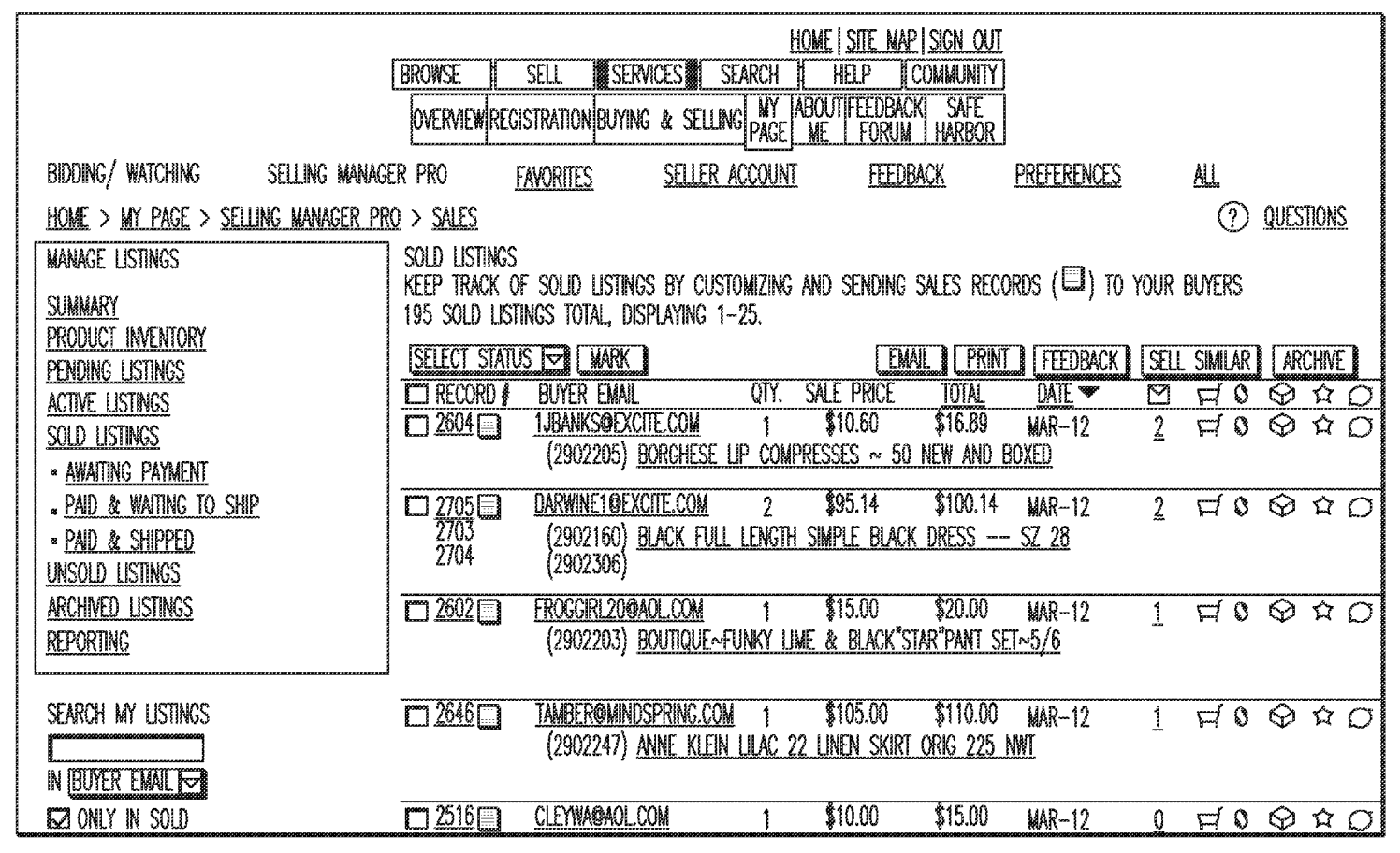

In one embodiment, a seller can review a list of buyers with combinable items purchased from the seller using a selling manager tool that assists the seller in operations within the marketplace. FIG. 26A illustrates an exemplary UI (Selling Manager Summary UI) including a link to a list of buyers with combinable items purchased from the seller. FIGS. 26B and 26C illustrate exemplary UIs (Selling Manager Sold Listings UIs) displaying orders containing multiple transactions.

Figure 27:
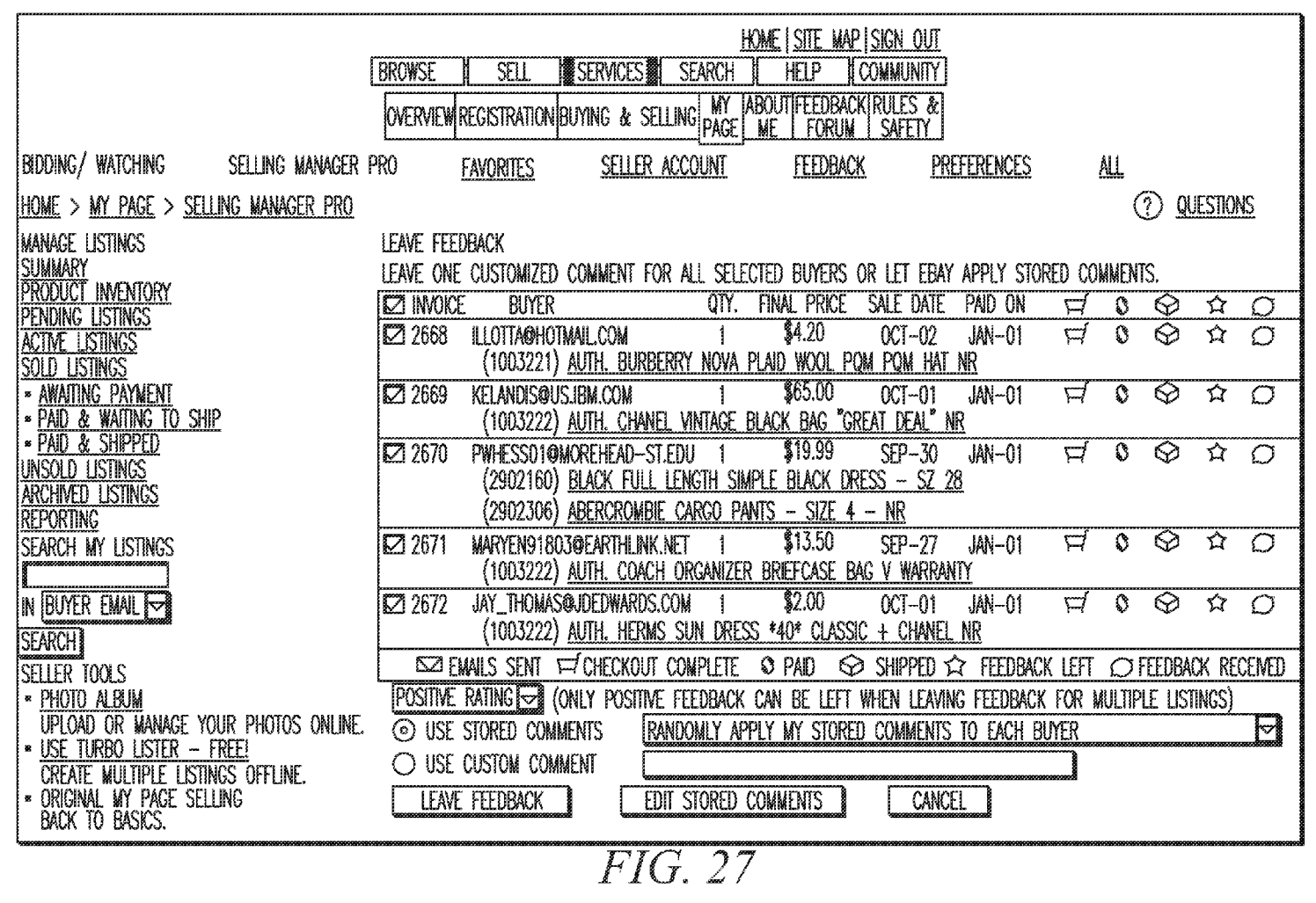

In one embodiment, a seller and a buyer may leave feedback for the entire order. Alternatively, they may leave feedback for each transaction within the order individually. FIG. 27 illustrates an exemplary UI (Selling Manager Leave Feedback UI) allowing the seller to leave feedback for the entire order.

In one embodiment, a shipping label and an invoice slip are automatically created for an order and can be printed by a seller for the package containing the order. FIG. 28 illustrates an exemplary shipping label and invoice combination created for an order.

Charge Rules for Combined Transactions

A seller may specify charge rules for combined transactions that will be applied to all subsequent combined purchases from this seller. In one embodiment, a seller is allowed to specify discount rules for charges associated with combined transactions, thus encouraging buyers to buy more items from the seller.

FIGS. 29A-29B and 30A-30C are block diagrams of several embodiments of a process for defining rules for charges associated with combined transactions. The process may be performed by processing logic, which may comprise hardware, software, or a combination of both. In one embodiment, processing logic resides in a payment server (e.g., one of the application servers 28 of FIG. 1).

Figure 29A:
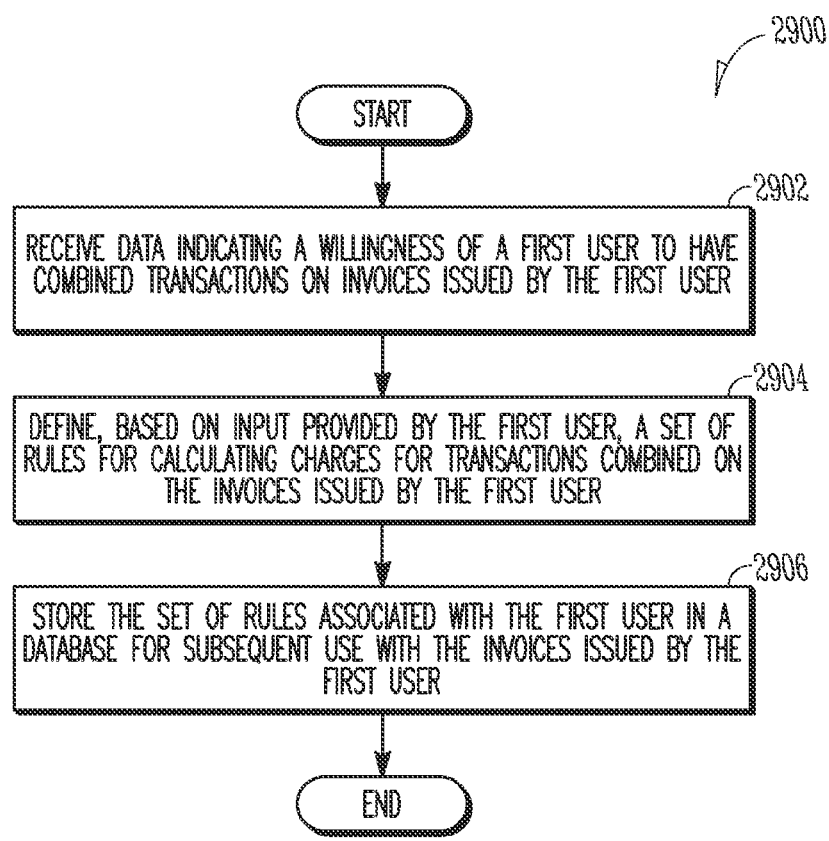
FIGS. 29A-29B and 30A-30C are block diagrams of several embodiments of a process for defining rules for charges associated with combined transactions.

Referring to FIG. 29A, process 2900 begins with processing logic receiving data indicating a willingness of a first user to have combined transactions on invoices issued by the first user (processing block 2902). In one embodiment, this data is received via a user interface soliciting input from the first user with respect to invoices consolidating multiple transactions.

At processing block 2904, processing logic defines a set of rules for calculating charges for transactions combined on the invoices issued by the first user. In one embodiment, the set of rules pertain to shipping and handling rates and shipping insurance rates. In one embodiment, the set of rules is defined based on input provided by the first user via user interfaces presented by processing logic.

At processing block 2906, processing logic stores the set of rules associated with the first user in a database for subsequent use with invoices issued by the first user. In one embodiment, the set of rules defined based on user input provided via UIs associated with a marketplace site can only be used with items purchased via this marketplace site.

Figure 29B:
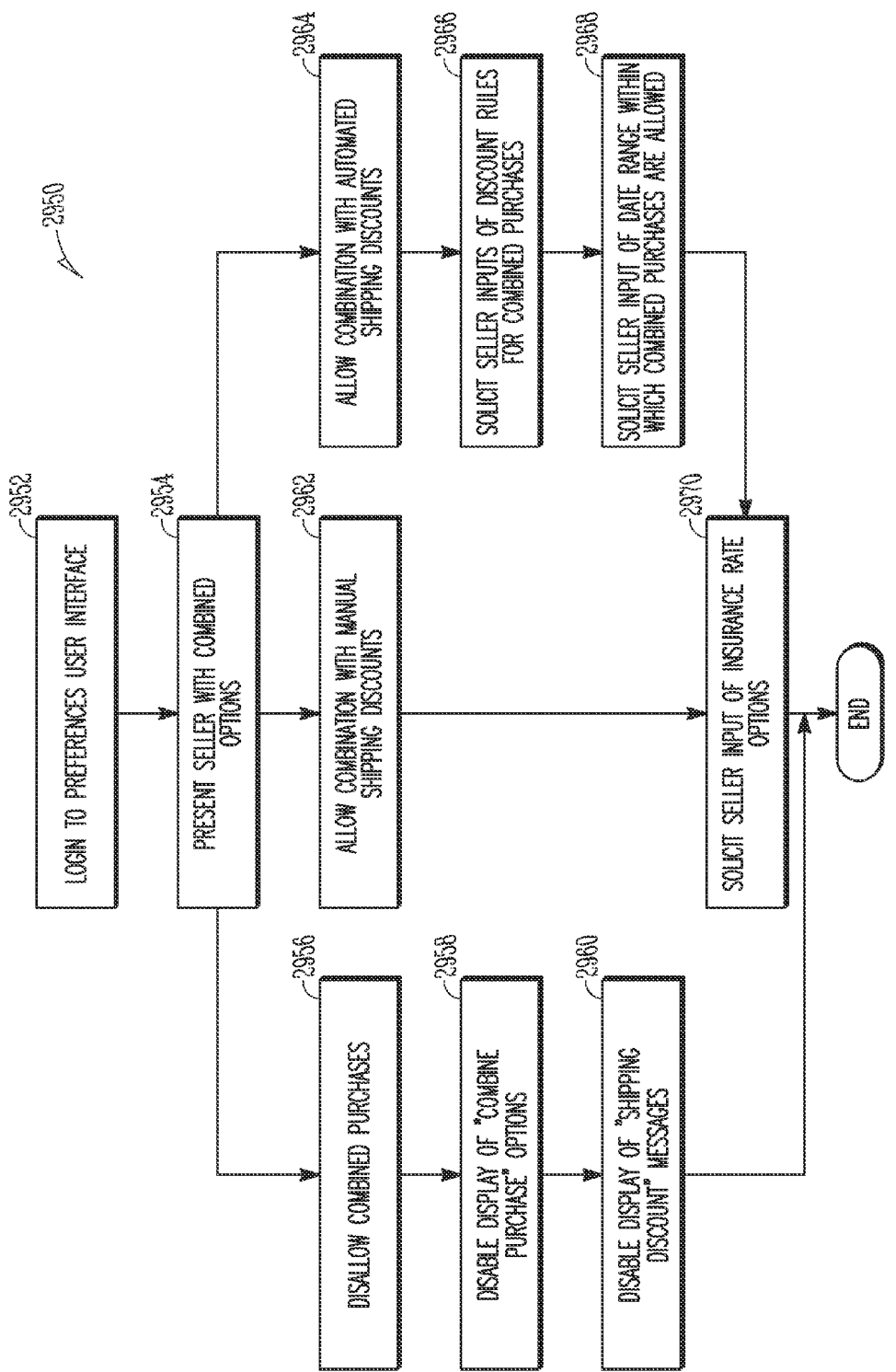

Referring to FIG. 29B, process 2900 will be described in conjunction with exemplary user interfaces illustrated in FIGS. 31A-31F.

Figure 31A:
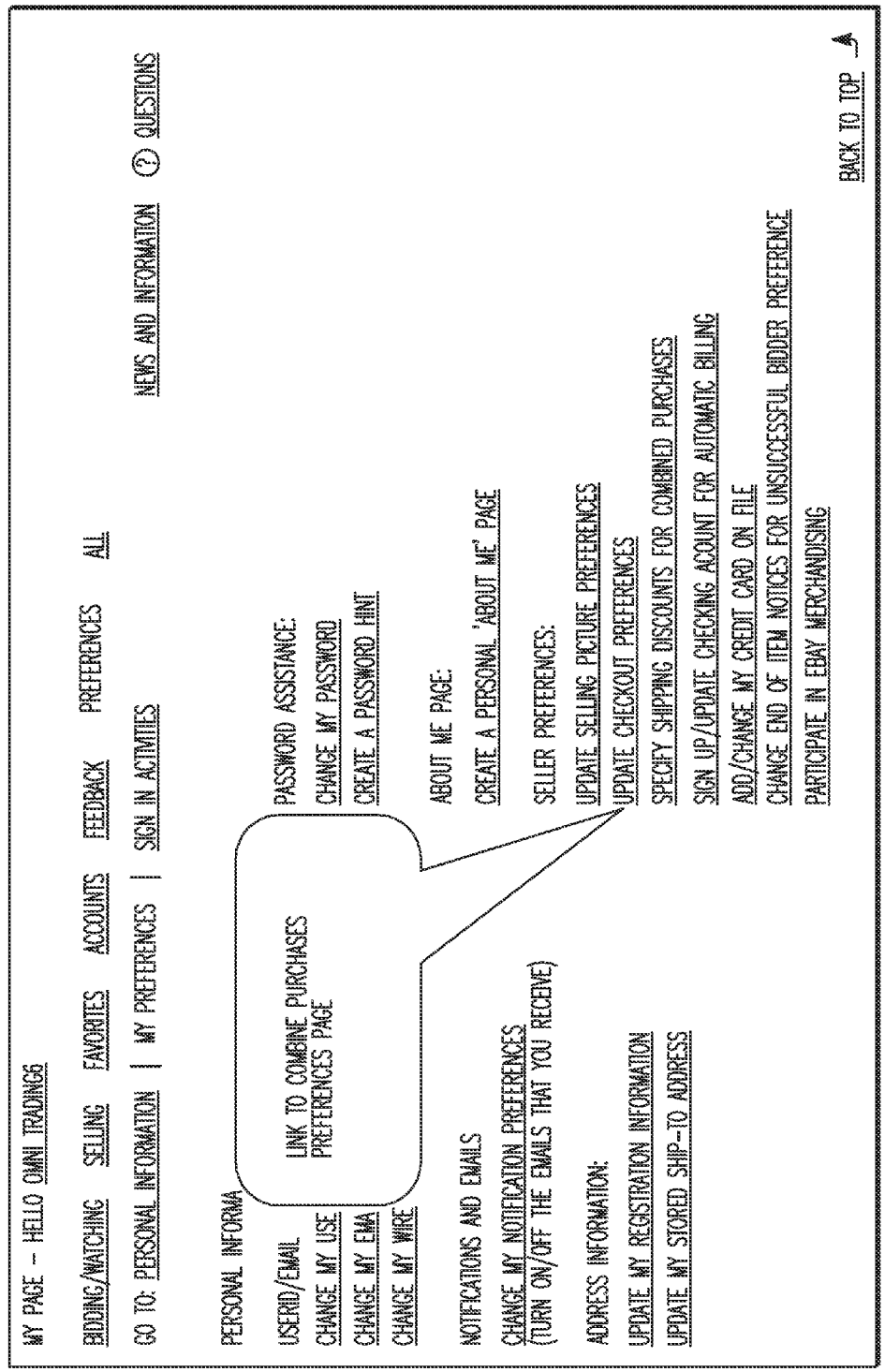

Process 2950 begins with processing logic presenting a Login to Preferences UI to a seller (processing block 2952). FIG. 31A illustrates an exemplary Login to Preferences UI.

At processing block 2954, processing logic presents options for combining transactions to the seller. FIG. 31B illustrates an exemplary Combine Purchases Preference UI.

If processing logic receives data indicating that the seller does not allow combined transactions (processing block 2956), processing logic disables combine purchases UIs (processing block 2958) and the display of shipping discount messages on UIs presented to users of the marketplace (processing block 2960).

Figure 31C:
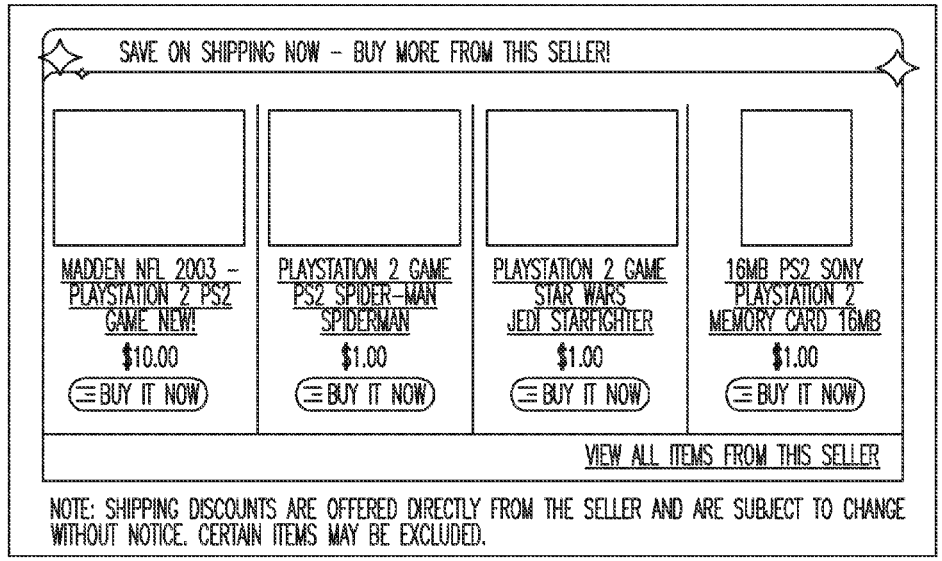
Figure 31D:
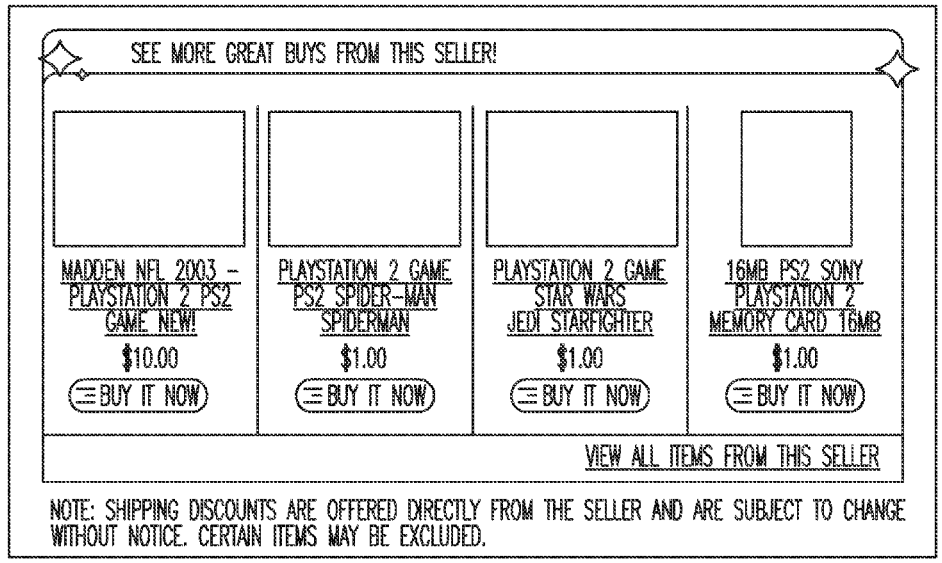

If processing logic receives data indicating that the seller allows combined transactions with manual shipping discounts (processing block 2962), processing logic enables combine purchases UIs and the display of messages encouraging multiple purchases from the seller, and solicits the seller's input of insurance rate options (processing block 2970). FIG. 31D illustrates an exemplary UI displaying the message "See More Great Buys from this seller" for a seller who selected an option of combined transactions with manual shipping discounts.

Figure 31E:
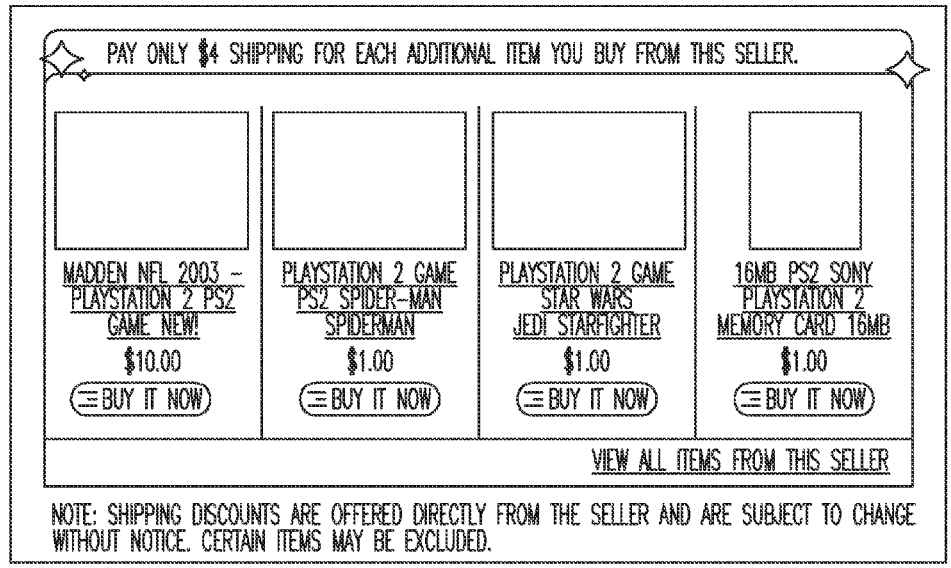
Figure 31F:
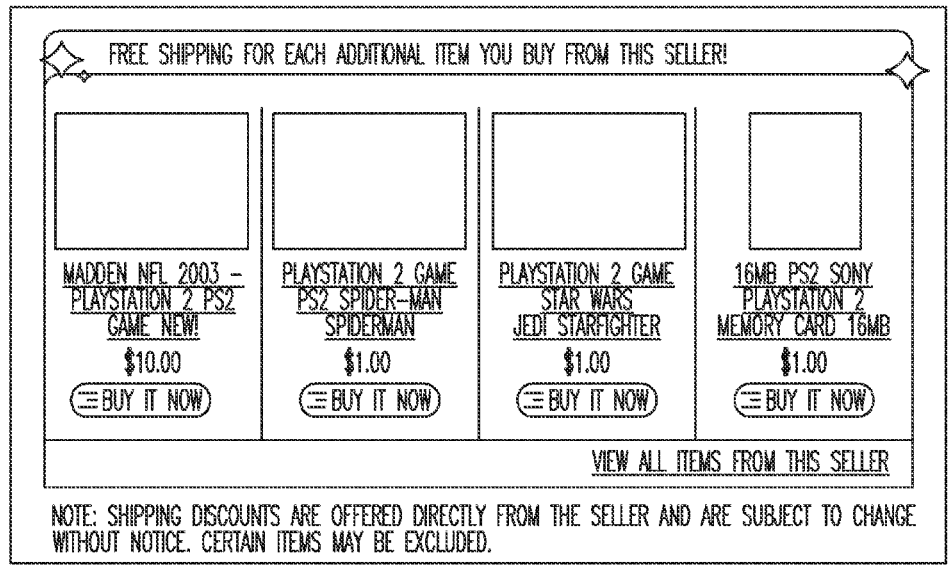

If processing logic receives data indicating that the seller allows combined transactions with automated shipping discounts (processing block 2962), processing logic enables combine purchases Ws, solicits the seller's input of shipping discount rules for combined purchases (processing block 2966), solicits the seller's input of the date range within which combined purchases are allowed (processing block 2968), and solicits the seller's input of insurance rate options (processing block 2970). Processing logic also enables the display of messages advertising shipping discounts for combined purchases from the seller. FIGS. 31C, 31E and 31F illustrate exemplary UIs displaying shipping discount messages that vary depending on discount rules specified by the seller.

Figure 30A:
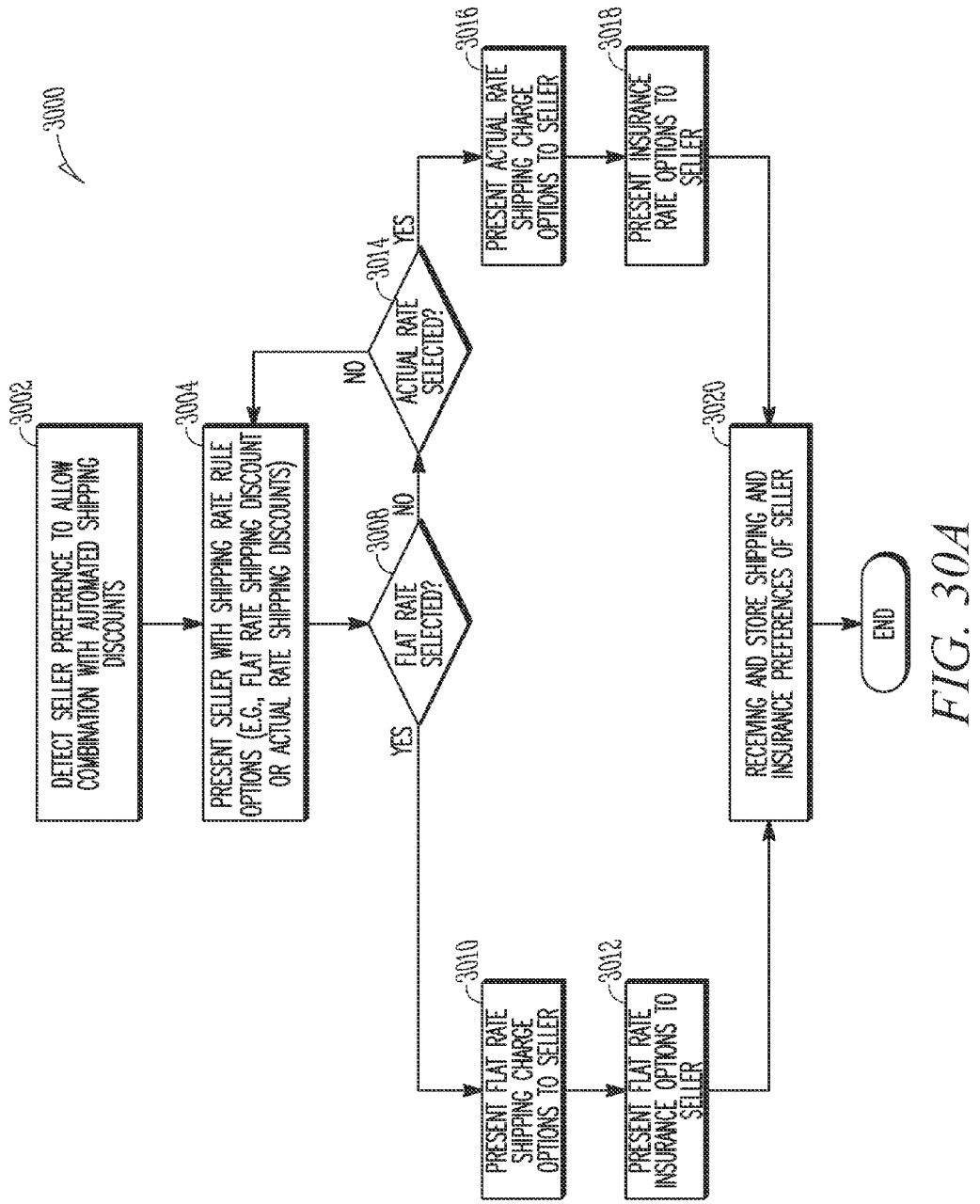

Referring to FIG. 30A, process 3000 begins with processing logic detecting a seller preference for automated shipping discount rules for combined transactions (processing block 3002) and presenting the seller with shipping rate rule options (processing block 3004). In the described embodiment, the shipping rate rule options include a flat rate rule option and an actual rate rule option. However, other embodiments may use additional and/or different rule options without loss of generality.

If processing logic receives data indicating the seller's selection of the flat rate option (processing block 3008), processing logic presents flat rate shipping charge options (processing block 3010) and flat rate insurance options to the seller (processing block 3012), and receives and stores shipping and insurance preferences of the seller in the database (processing block 3020).

If processing logic receives data indicating the seller's selection of an actual rate option (processing block 3014), processing logic presents actual rate shipping charge options (processing block 3016) and insurance options to the seller (processing block 3018), and receives and stores shipping and insurance preferences of the seller in the database (processing block 3020).

Figure 30B:
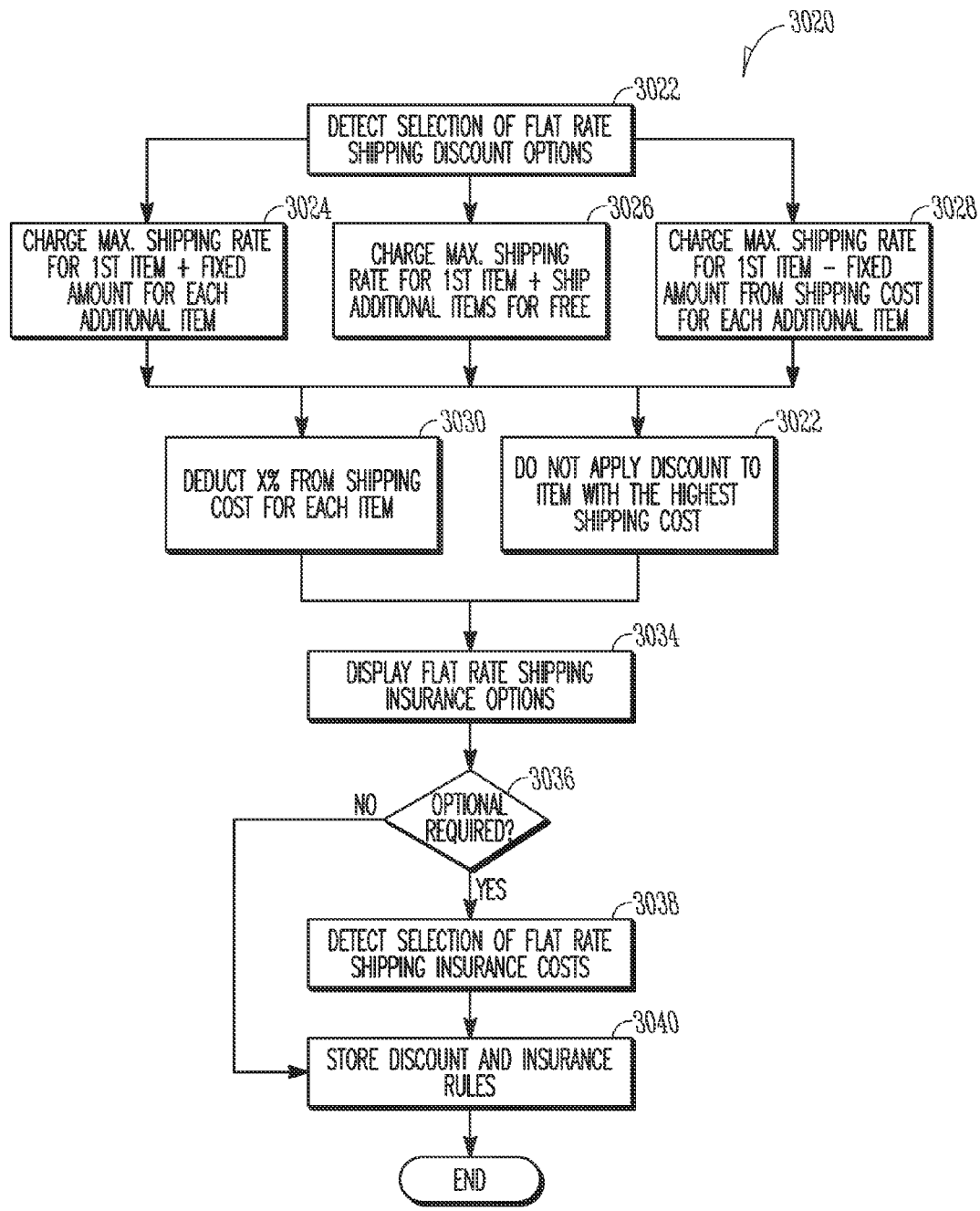

Referring to FIG. 30B, process 3020 begins with processing logic detecting a seller's selection of a flat rate shipping discount (processing block 3022) and presenting a set of options for the flat rate shipping discount. Based on user input, processing logic may receive data identifying the seller's selection of an option to charge a maximum shipping rate for the first item and a fixed amount for each additional item (processing block 3024), data identifying the seller's selection of an option to charge a maximum shipping rate for the first item and no charge for additional items (processing block 3026), or data identifying the seller's selection of an option to charge a maximum shipping rate for the first item and deduct a fixed amount from the shipping cost of each additional item (processing block 3026).

Next, in one embodiment, processing logic may receive the seller's instruction to deduct a certain percentage from the shipping cost of each item in the order (processing block 3030). Alternatively, processing logic may receive the seller's instruction to refrain from applying a discount to an item with the highest shipping cost (processing block 3032).

Once processing logic defines shipping rate rules, it begins defining shipping insurance rules. Specifically, processing logic displays a set of options for a flat rate shipping insurance (processing block 3034). These options may include, for example, an insurance not offered option, an optional insurance option, a required insurance option, and an insurance included in shipping and handling option.

If processing logic receives data indicating the seller's selection of an optional insurance option or a required insurance option (processing block 3036), processing logic allows the seller to specify fixed insurance amounts for different price ranges (processing block 3038), and saves the shipping and insurance rules in the database (processing block 3040).

If processing logic receives data indicating the seller's selection of an insurance not offered option or an insurance included in shipping and handling option, processing logic proceeds directly to processing block 3040.

FIG. 32A illustrates an exemplary UI (Combine Purchases Preference UI) displaying options for flat rate shipping and insurance discounts.

Figure 30C:
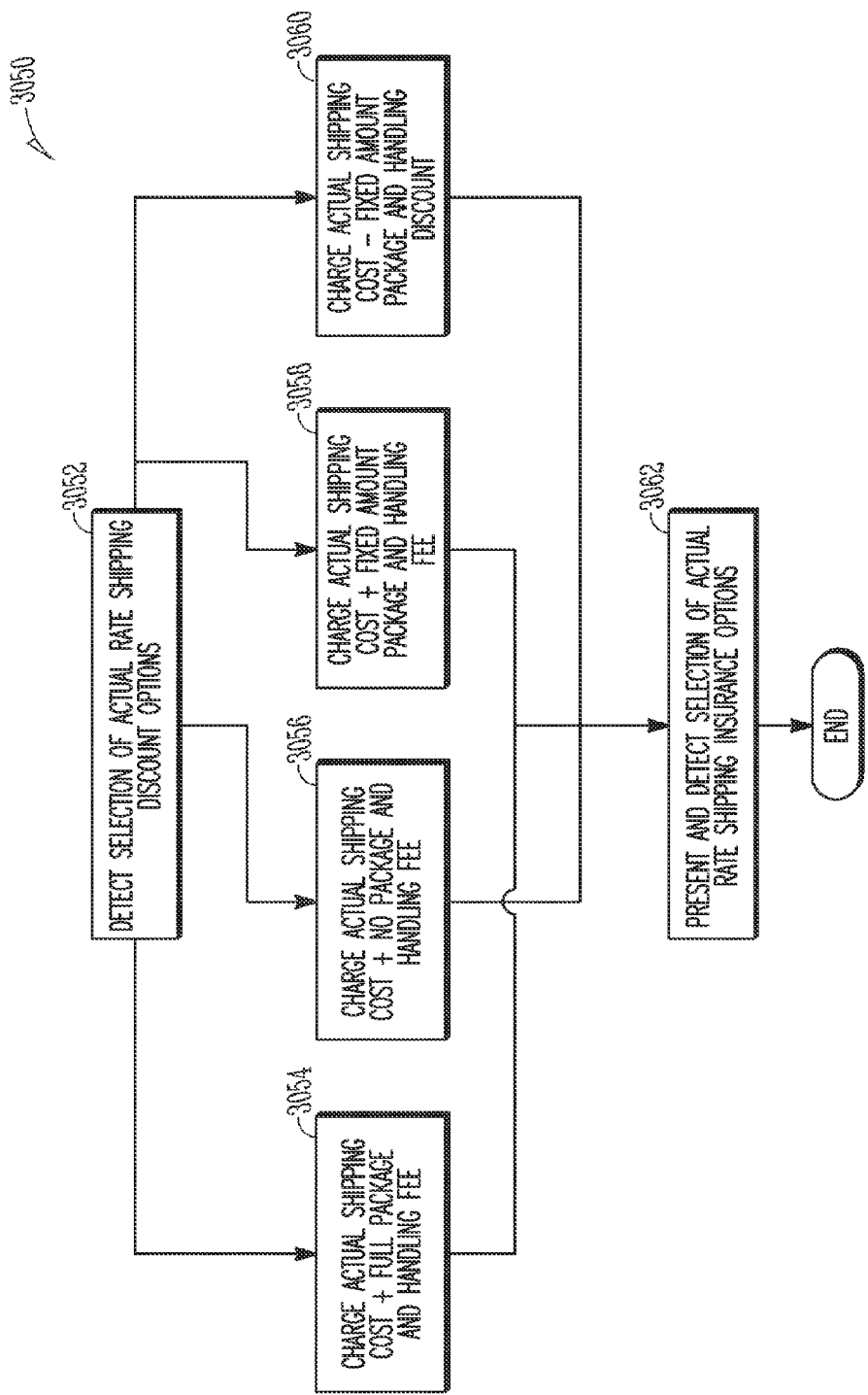

Referring to FIG. 30C, process 3050 begins with processing logic detecting a seller's selection of an actual rate shipping discount (processing block 3052) and presenting a set of options for the actual rate shipping discount. Based on user input, processing logic may receive data identifying the seller's selection of an option to charge an actual shipping cost (based on the weight of the items in the order) and full package and handling fee (processing block 3054), data identifying the seller's selection of an option to charge an actual shipping cost and no package and handling fee (processing block 3056), data identifying the seller's selection of an option to charge an actual shipping cost and a fixed amount for package and handling fee for the entire order (processing block 3058), or data identifying the seller's selection of an option to charge, for each item, an actual shipping cost minus a fixed package and handling discount (processing block 3060).

Once processing logic defines shipping rate rules, it begins defining shipping insurance rules. Specifically, processing logic displays a set of options for an actual rate shipping insurance. These options may include, for example, an insurance not offered option, an optional insurance option, a required insurance option, and an insurance included in shipping and handling option. Processing logic then detects the seller's selection of an insurance option (processing block 3062), and saves the shipping and insurance rules in the database (processing block 3040).

FIG. 32B illustrates an exemplary UI (Combine Purchases Preference UI) displaying options for actual rate shipping discounts.

In one embodiment, the charge rules for combined purchases can be modified by a seller. FIG. 33A illustrates an exemplary UI (Combined Purchases Preferences Changes UI) confirming changes to the charge rules.

In one embodiment, the date of modification is saved, and the seller or his trading partner can request to review a history of rule modifications. In addition, once the rules are modified, a message may be displayed to the seller's trading partners, indicating such a modification. FIG. 33B illustrates an exemplary UI (Combined Purchases UI) displaying a shipping discount modification warning.

Figure 34B:
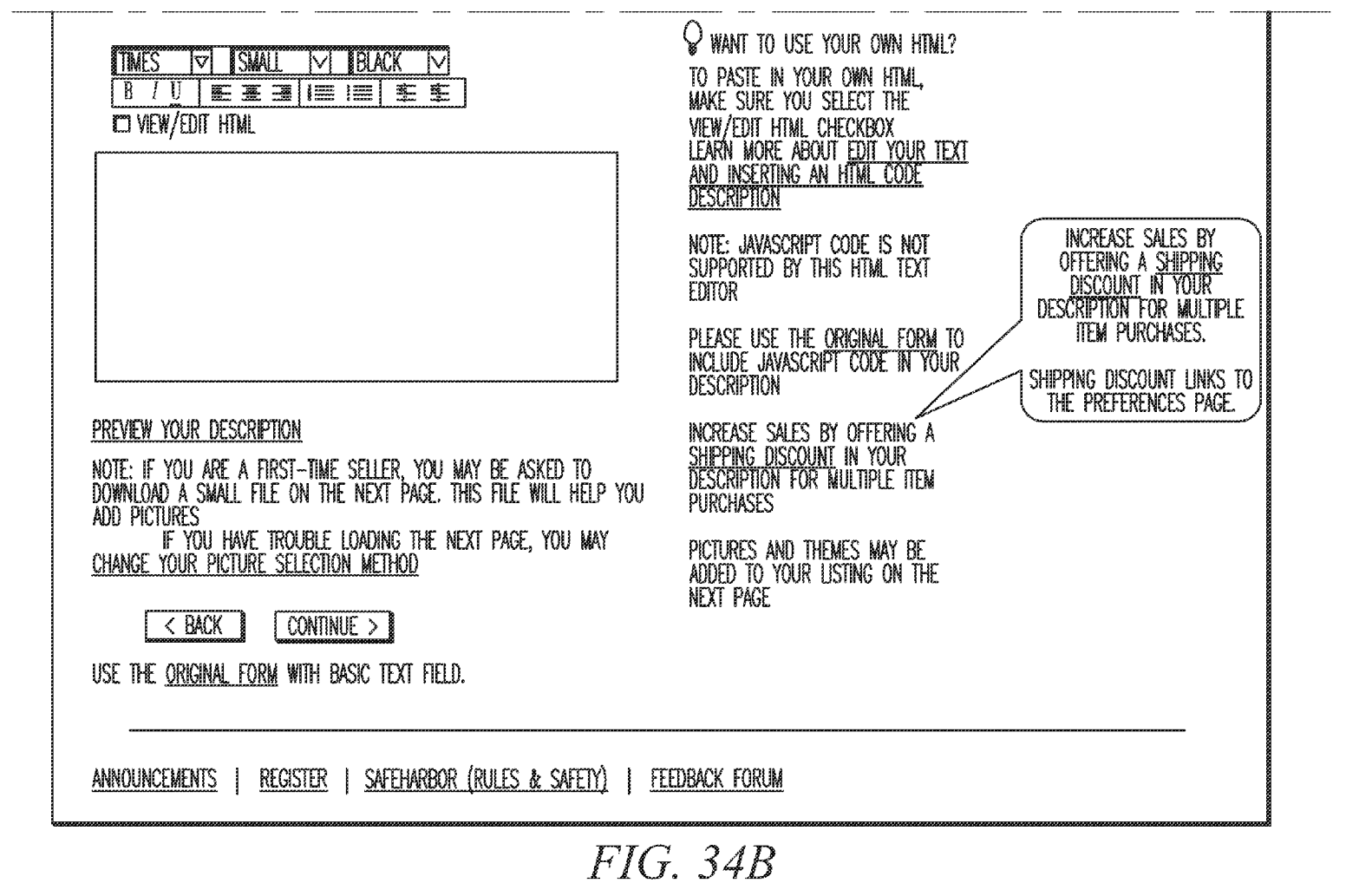

In one embodiment, a seller can modify charge rules or specify new charge rules for combined purchases when describing a new item to be offered within the network-based marketplace. FIG. 34 illustrates an exemplary UI (Sell Your Item UI) including a link to a Combined Purchases Preference UI where the charge rules can be specified.

Figure 35:
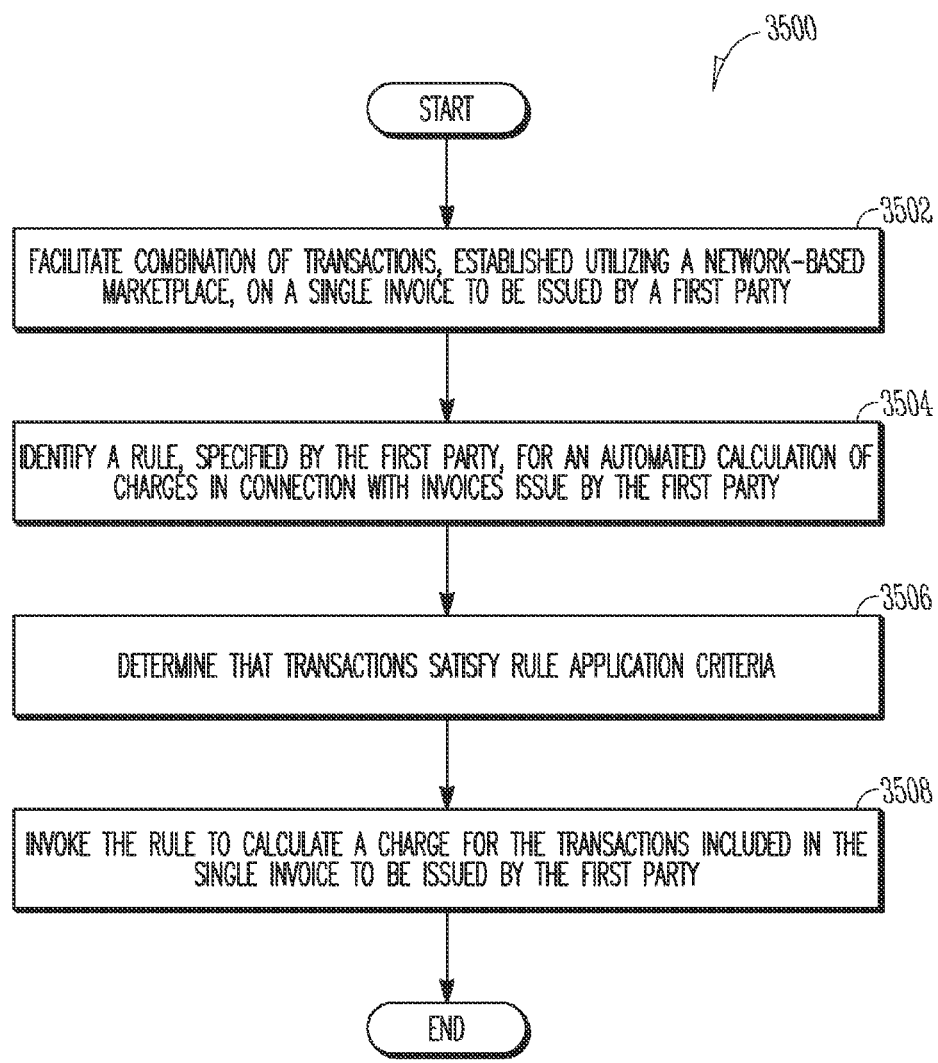
FIGS. 35 and 37 are block diagrams of two embodiments of a process for calculating charges for invoices including combined transactions using predefined charge rules.

FIGS. 35 and 37 are block diagrams of several embodiments of a process for calculating charges for invoices with combined transactions using predefined charge rules. The process may be performed by processing logic, which may comprise hardware, software, or a combination of both. In one embodiment, processing logic resides in a payment server (e.g., one of the application servers 28 of FIG. 1).

Referring to FIG. 35, process 3500 begins with processing logic facilitating a combination of transactions on a single invoice to be issued by a first party (processing block 3502). In one embodiment, the combination of transactions is facilitated via an order creation process described in more details above.

At processing block 3504, processing logic identifies a rule, specified by the first user, for an automated calculation of charges in connection with invoices issued by the first party. The charges may include shipping charges, package and handling charges, insurance charges, etc. In one embodiment, the rule is identified by retrieving the rule associated with the first party from the database.

At processing block 3506, processing logic determines that the transactions being combined satisfy rule application criteria. The rule application criteria may require, for example, that each transaction have shipping details specified, all transactions have the same type of shipping cost (e.g., flat rate or actual rate), all transactions with the same type of shipping cost share the same shipping method, etc.

At processing block 3508, processing logic dynamically invokes the rule to calculate charges for the transactions included in the order, and displays the calculated charges with the order. In one embodiment, processing logic also computes a difference between the charges calculated using a discount provided by the charge rule and charges calculated without a discount, and displays the difference to the buyer. FIG. 36 illustrates an exemplary UI (Combine Purchases UI) that specifies how much the buyer can save on shipping by combining transactions into a single order.

Figure 37A:
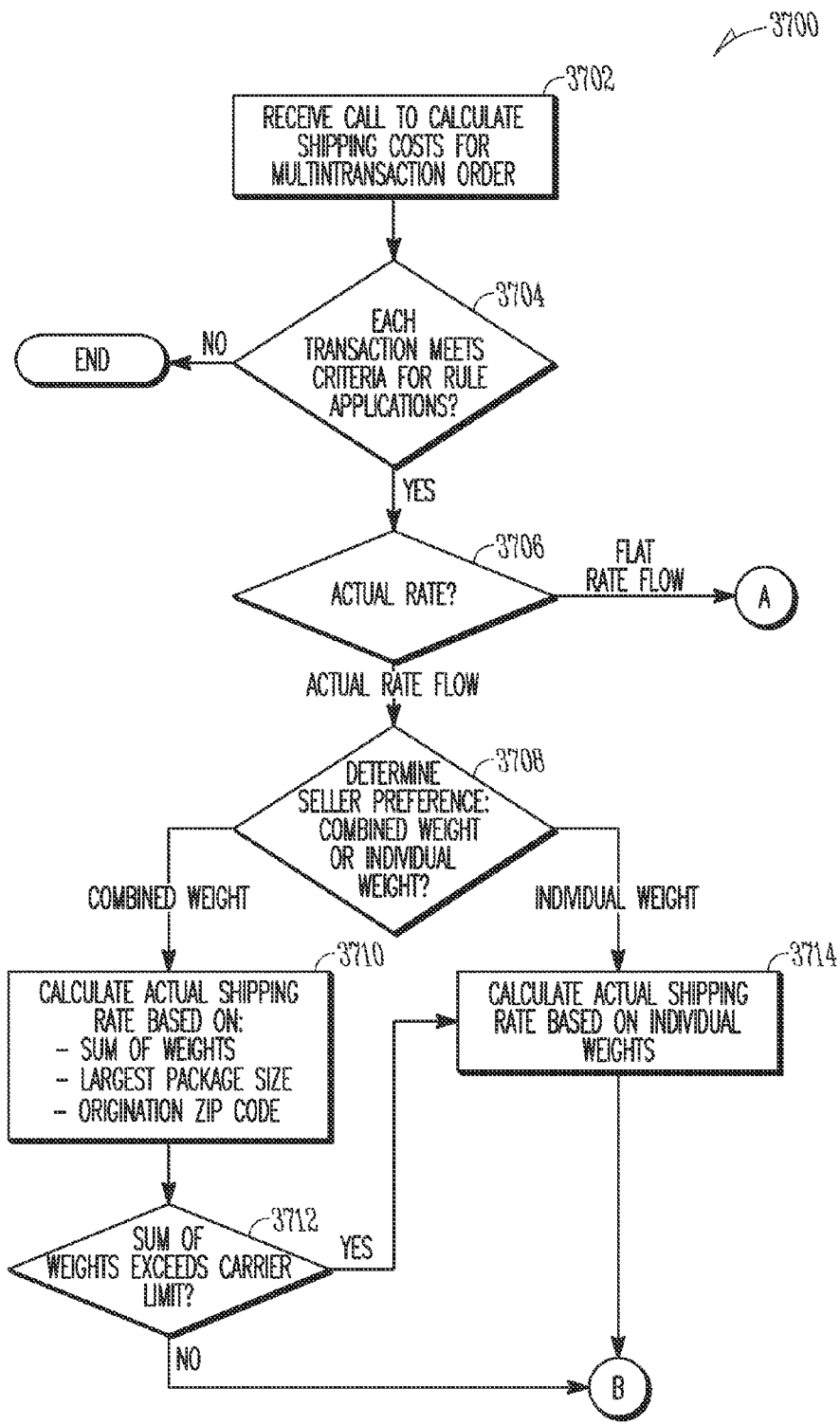
Figure 37B:
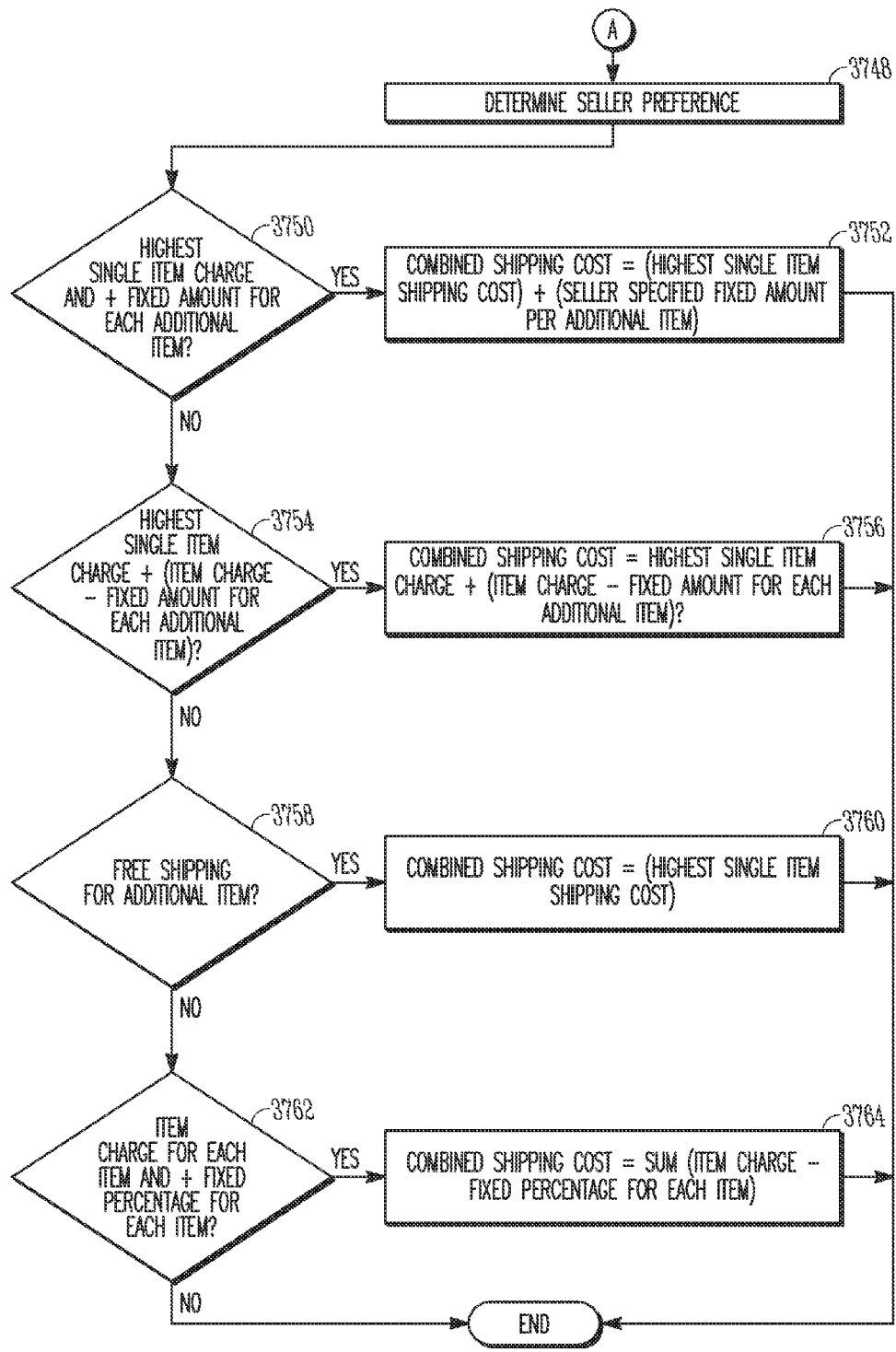
Figure 37C:
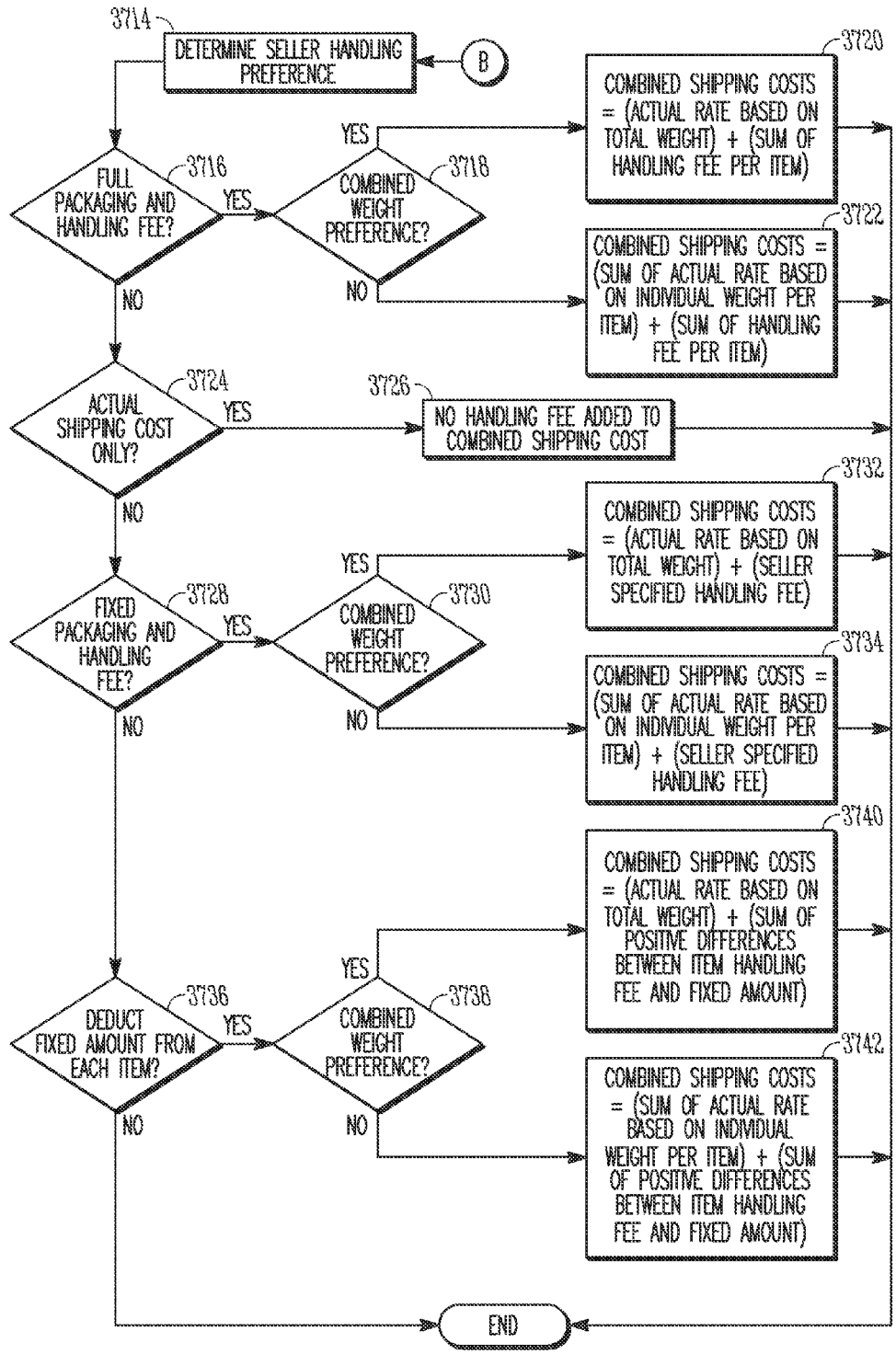

Referring to FIGS. 37A-37C, process 3700 begins with processing logic receiving a call to calculate shipping costs for multi-transaction order (processing block 3702), determining whether each transaction meets rule application criteria (processing block 3704), and, if so, retrieving charge rules applicable to the multi-transaction order. The rule application criteria may require, for example, that each transaction have shipping details specified, all transactions have the same type of shipping cost (e.g., flat rate or actual rate), all transactions with the actual shipping rate share the same shipping method if using a combined weight measure, etc.

Next, processing logic determines whether the charge rules are based on actual rate (processing block 3706). If so, processing logic determines whether the rules are based on combined weight or individual weight (processing block 3708). If the rules are based on combined weight, processing logic determines whether the combined weight exceeds carrier limit (processing block 3712). If not, processing logic proceeds to processing block 3714.

If the combined weight exceeds the carrier limit, or the rules are based on individual weight, processing logic calculates actual shipping rate based on weight of individual items (processing block 3714) and proceeds to processing block 3714.

At processing block 3714, processing logic determines the seller's handling fee preferences. If the rules specify full packaging and handling fee (processing block 3716) and the rules are based on combined weight (processing block 3718), processing logic calculates combined shipping costs by adding the actual rate based on total weight to the sum of handling fees of all items (processing block 3720).

If the rules specify full packaging and handling fee (processing block 3716) and the rules are based on individual weight (processing block 3718), processing logic calculates combined shipping costs by adding the sum of actual rates based on individual shipping rate per item to the sum of handling fees of all items (processing block 3722).

If the rules specify actual shipping cost only (processing block 3724), processing logic does not add any handling fee to the combined shipping cost (processing block 3726).

If the rules specify fixed packaging and handling fee (processing block 3728) and the rules are based on combined weight (processing block 3730), processing logic calculates combined shipping costs by adding the actual shipping rate based on total weight to the seller-specified handling fee (processing block 3732).

If the rules specify fixed packaging and handling fee (processing block 3728) and the rules are based on individual weight (processing block 3730), processing logic calculates combined shipping costs by adding the sum of actual rates based on individual rate per item to the seller-specified handling fee (processing block 3734).

If the rules require that a fixed amount be deducted from a handling fee of each item (processing block 3736) and the rules are based on combined weight (processing block 3738), processing logic calculates combined shipping costs by computing, for each item, a difference between the handling fee of this item and the fixed amount, calculating the sum of all positive differences (differences that are equal to, or greater than, zero) and adding the calculated sum to the actual rate based on total weight (processing block 3740).

If the rules require that a fixed amount be deducted from a handling fee of each item (processing block 3736) and the rules are based on individual weight (processing block 3738), processing logic calculates combined shipping costs by computing, for each item, a difference between the handling fee of this item and the fixed amount, calculating the sum of all positive differences, and adding the calculated sum to the sum of actual shipping rate based on individual weight per item (processing block 3740).

If the charge rules are based on flat rate (processing block 3706), processing logic determines user-specified flat rate preference (processing block 3748). If the flat rate preference requires that the shipping cost be based on the highest single item charge plus a fixed amount for each additional item (processing block 3750), processing logic calculates the combined shipping cost by adding the highest single item charge and a fixed amount for each additional item (processing block 3752).

If the flat rate preference requires that the shipping cost be based on the highest single item charge plus a difference between the shipping cost and a fixed amount for each additional item (processing block 3754), processing logic calculates the combined shipping cost by computing differences between the shipping cost of each item and the fixed amount, calculating the sum of all positive differences, and adding the sum of positive differences to the highest single item shipping cost (processing block 3756).

If the flat rate preference requires free shipping for each additional item (processing block 3758), the combined shipping cost is equal to the highest single item shipping charge (processing block 3760).

If the flat rate preference requires that the shipping cost be based on item charge for each item minus a fixed percentage (processing block 3762), processing logic calculates the combined shipping cost by computing differences between the shipping cost of each item and the fixed percentage and calculating the sum of all positive differences (processing block 3764).

Exemplary Computer System

Figure 38:
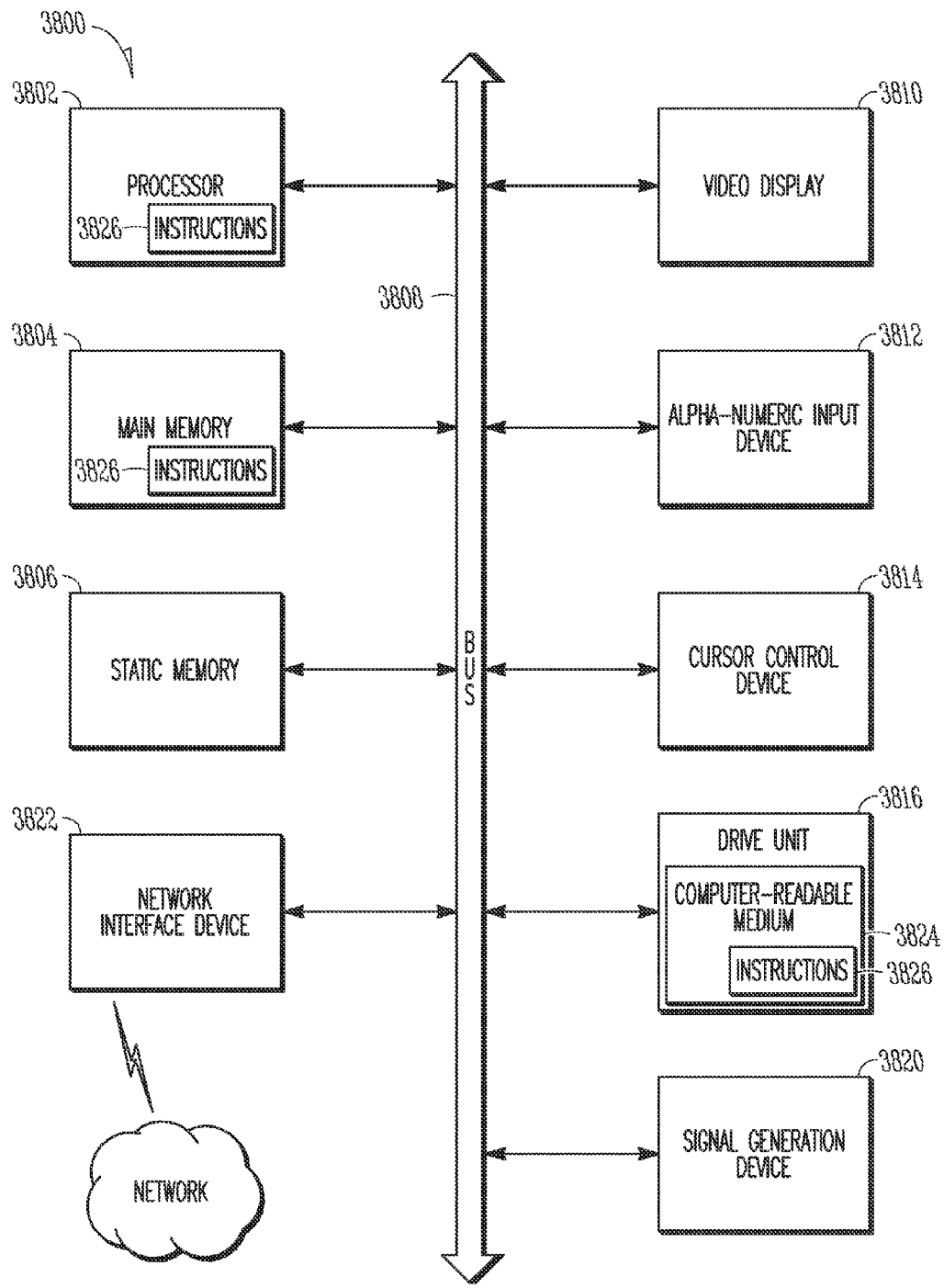
FIG. 38 is a diagrammatic representation of an exemplary computer system.

FIG. 38 shows a diagrammatic representation of machine in the exemplary form of a computer system 3800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 3800 includes a processor 3802 (e.g., a central processing unit (CPU) a graphics processing unit (GPU) or both), a main memory 3804 and a static memory 3806, which communicate with each other via a bus 3808. The computer system 3800 may further include a video display unit 3810 (e.g., a liquid crystal display (LCD) or a cathode ray tube (CRT)). The computer system 3800 also includes an alphanumeric input device 3812 (e.g., a keyboard), a cursor control device 3814 (e.g., a mouse), a disk drive unit 3816, a signal generation device 3818 (e.g., a speaker) and a network interface device 3820.

The disk drive unit 3816 includes a machine-readable medium 3822 on which is stored one or more sets of instructions (e.g., software 3824) embodying any one or more of the methodologies or functions described herein. The software 3824 may also reside, completely or at least partially, within the main memory 3804 and/or within the processor 3802 during execution thereof by the computer system 3800, the main memory 3804 and the processor 3802 also constituting machine-readable media.

The software 3824 may further be transmitted or received over a network 3826 via the network interface device 3820.

While the machine-readable medium 3892 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, methods and systems to facilitate generation of invoices combining multiple transactions established utilizing a multi-seller network-based marketplace have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to facilitate invoicing for transactions in a network-based transaction system, the method comprising:
    identifying, by a server machine, a plurality of transactions that each involve a seller and a plurality of buyers;

determining, by the server machine, that first and second transactions among the plurality of transactions satisfy combinability criteria that indicate the first and second transactions are combinable into a single invoice, the first transaction involving a first buyer of the plurality of buyers, the second transaction involving a second buyer of the plurality of buyers, the first buyer being different than the second buyer;

providing to the seller, by the server machine, an indication that the first and second transactions are combinable into the single invoice;

receiving a request from the seller to combine the first and second transactions into the single invoice;

generating the single invoice; and sending the single invoice to the first buyer and the second buyer in response to the request, wherein each buyer can only view a portion of the single invoice.

2. The method of claim 1, wherein the network-based transaction system comprises a network-based marketplace.

3. The method of claim 1, wherein the providing of the indication comprises:
displaying on a client machine the first and second transactions with an indicator that indicates that the first and second transactions are combinable.

4. The method of claim 3, wherein the indicator is an icon.

5. The method of claim 1, wherein the providing of the indication comprises:
providing, by the server machine, a filter for combinable transactions; and
displaying on a client machine the first and second transactions in response to a selection of the filter for combinable transactions by the seller.

6. The method of claim 1, wherein the determining of the first and second transactions includes determining, by the server machine, whether the seller agreed to combine the first and second transactions involving the seller.

7. The method of claim 6, wherein the determining includes retrieving, by the server machine, one or more seller-defined charge rules with respect to the first and second transactions involving the seller.

8. The method of claim 1, wherein the determining of the first and second transactions includes detecting by the server machine, that the first and second transactions are at least one of unpaid, in a same currency, or associated with the network-based transaction system.

9. The method of claim 1, further comprising providing a discount to one or more of the seller and the plurality of buyers in response to one or more of the seller and the plurality of buyers agreeing to combine transactions that satisfy the combinability criteria.

10. The method of claim 1, further comprising providing to the seller an amount of savings resulting from combining the first and second transactions.

11. The method of claim 1, wherein the determining of the first and second transactions includes detecting that the first and second transactions are between the seller and the plurality of buyers in the network-based transaction system.

12. A non-transitory machine-readable medium storing a set of instructions that, when executed by the machine, cause the machine to perform operations to facilitate invoicing for transactions in a network-based transaction system, the operations including:
identifying a plurality of transactions that each involve a seller and plurality of buyers;
determining that first and second transactions among the plurality of transactions satisfy combinability criteria that indicate the first and second transactions are combinable into a single invoice, the first transaction involving a first buyer of the plurality of buyers, the second transaction involving a second buyer of the plurality of buyers, the first buyer being different than the second buyer;
providing to the seller an indication that the first and second transactions are combinable into the single invoice;
receiving a request from the seller to combine the first and second transactions into the single invoice;
generating the single invoice; and
sending the single invoice to the first buyer and the second buyer in response to the request, wherein each buyer can only view a portion of the single invoice.

13. The non-transitory machine readable medium of claim 12, wherein the network-based transaction system comprises a network-based marketplace.

14. The non-transitory machine readable medium of claim 12, wherein the providing of the indication comprises:
displaying on a client machine the first and second transactions with an indicator that indicates that the first and second transactions are combinable.

15. The non-transitory machine readable medium of claim 14, wherein the indicator is an icon.

16. The non-transitory machine readable medium of claim 12, wherein the providing of the indication comprises:
providing, by the server machine, a filter for combinable transactions; and
displaying on a client machine the first and second transactions in response to a selection of the filter for combinable transactions by the seller.

17. The non-transitory machine readable medium of claim 12, wherein the determining of the first and second transactions includes determining, by the server machine, whether the seller agreed to combining the first and second transactions involving the seller.

18. The non-transitory machine readable medium of claim 17, wherein the determining includes retrieving, by the server machine, one or more seller-defined preferences with respect to combining the first and second transactions involving the seller.

19. The non-transitory machine readable medium of claim 12, wherein the determining of the first and second transactions includes detecting, by the server machine, that the first and second transactions are at least one of unpaid, involve a same currency, and are associated with the network based transaction system.

20. The non-transitory machine readable medium of claim 12, further comprising providing a discount to one or more of the seller and the plurality of buyers in response to one or more of the seller and the plurality of buyers agreeing to combine transactions that satisfy the combinability criteria.

21. The non-transitory machine readable medium of claim 12, further comprising providing to the seller an amount of savings resulting from combining the first and second transactions.

22. The non-transitory machine readable medium of claim 12, wherein the determining of the first and second transactions includes detecting that the first and second transactions are between the seller and the plurality of buyers in the network-based transaction system.

23. A system to facilitate invoicing for transactions in a network-based transaction system, the system comprising:
a memory;
a processor in communication with the memory; and
one or more modules comprising instructions stored in the memory and executed by the processor to perform operations comprising:

identifying a plurality of transactions that each involve a seller and a plurality of buyers;

determining that first and second transactions among the plurality of transactions satisfy combinability criteria that indicate the first and second transactions are combinable into a single invoice, the first transaction involving a first buyer of the plurality of buyers, the second transaction involving a second buyer of the plurality of buyers, the first buyer being different than the second buyer;

providing to the seller an indication that the first and second transactions are combinable into the single invoice;

receiving a request from the seller to combine the first and second transactions into the single invoice;

generating the single invoice; and sending the single invoice to the first buyer and the second buyer in response to the request, wherein each buyer can only view a portion of the single invoice.

\* \* \* \* \*